US012739816B2

(12) United States Patent
Fan

(10) Patent No.: US 12,739,816 B2
(45) Date of Patent: Sep. 15, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 302 days.

(21) Appl. No.: 18/368,082

(22) Filed: Sep. 14, 2023

(65) Prior Publication Data

US 2024/0008027 A1 Jan. 4, 2024

Related U.S. Application Data

(63) Continuation of application No. PCT/CN2021/081768, filed on Mar. 19, 2021.

(51) Int. Cl.
*H04W 72/12* (2023.01)
*H04L 41/16* (2022.01)
*H04W 80/02* (2009.01)

(52) U.S. Cl.
CPC ............. *H04W 72/12* (2013.01); *H04L 41/16* (2013.01); *H04W 80/02* (2013.01)

(58) Field of Classification Search
None
See application file for complete search history.

(56) References Cited

U.S. PATENT DOCUMENTS 12,020,142 B2 * 6/2024 Zhu ........................ G06N 3/063
12,120,774 B2 * 10/2024 Tomala ................. G06N 20/00
(Continued)

FOREIGN PATENT DOCUMENTS

CN 108924910 A 11/2018
CN 111954309 A 11/2020
(Continued)

OTHER PUBLICATIONS

Extended European Search Report dated Apr. 3, 2024 received in European Patent Application No. EP21930867.3.
(Continued)

*Primary Examiner* — Otis L Thompson, Jr.
(74) *Attorney, Agent, or Firm* — Sheppard, Mullin, Richter & Hampton LLP

(57) ABSTRACT

The embodiments of the present disclosure provide a wireless communication method, a terminal device and a network device. At least one AI functional entity and/or at least one joint AI functional entity is defined in a communication protocol stack, capable of adaptively adjusting configuration information based on actual requirements, thereby achieving intelligent optimization of the communication protocol stack and improving the performance of the communication system. The wireless communication method includes: receiving or transmitting, by a terminal device, configuration information via at least one Artificial Intelligence (AI) functional entity and/or at least one joint AI functional entity. The at least one AI functional entity has a first association with a communication protocol sublayer of the terminal device, and the at least one joint AI functional entity has a second association with the communication protocol sublayer of the terminal device.

20 Claims, 8 Drawing Sheets

(56) References Cited

U.S. PATENT DOCUMENTS

| | | | | |
|---|---|---|---|---|
| 2019/0050735 | A1 | 2/2019 | Ji et al. | |
| 2020/0044955 | A1 * | 2/2020 | Pugaczewski | H04L 45/14 |
| 2020/0257602 | A1 * | 8/2020 | Crosby | G06N 3/04 |
| 2020/0358810 | A1 * | 11/2020 | Fellows | G06N 20/00 |
| 2020/0366326 | A1 * | 11/2020 | Jassal | G06N 3/045 |
| 2021/0064996 | A1 | 3/2021 | Wang et al. | |
| 2021/0326701 | A1 * | 10/2021 | Bai | H04W 24/10 |
| 2021/0390434 | A1 * | 12/2021 | Bai | H04W 24/02 |
| 2022/0104033 | A1 * | 3/2022 | Ly | H04L 67/01 |
| 2022/0141715 | A1 * | 5/2022 | Mayor | H04W 24/02 370/254 |
| 2022/0279341 | A1 * | 9/2022 | Tomala | G06N 20/00 |
| 2022/0312424 | A1 * | 9/2022 | Ye | G06N 3/0499 |
| 2022/0322111 | A1 * | 10/2022 | Zhang | H04W 24/02 |
| 2022/0408282 | A1 * | 12/2022 | Zhang | H04L 67/12 |
| 2023/0010095 | A1 * | 1/2023 | Alabbasi | H04L 41/145 |

FOREIGN PATENT DOCUMENTS

| | | | |
|---|---|---|---|
| CN | 112383927 | A | 2/2021 |
| WO | 2021048600 | A1 | 3/2021 |

OTHER PUBLICATIONS

International Search Report and Written Opinion dated Dec. 2, 2021 in International Application No. PCT/CN2021/081768. English translation attached.

"3rd Generation Partnership Project; Technical Specification Group Radio Access Network;NR;Radio Resource Control (RRC) protocol specification (Release 16)", 3GPP TS 38.331 V16.3.1, Jan. 7, 2021, section 4 and/or 5 and/or 6.2 and/or 6.3.

"3rd Generation Partnership Project; Technical Specification Group Radio Access Network;NR; NR and NG-RAN Overall Description;Stage 2(Release 16)", 3GPP TS 38.300 V16.4.0, Jan. 6, 2021, section 4.4 and/or 6 and/or 7.

"3rd Generation Partnership Project; Technical Specification Group Radio Access Network;NR;Medium Access Control (MAC) protocol specification(Release 16)", 3GPP TS 38.321 V16.3.0, Jan. 6, 2021, section 4.

"3rd Generation Partnership Project; Technical Specification Group Radio Access Network;NR;Radio Link Control (RLC) protocol specification(Release 16)", 3GPP TS 38.322 V16.2.0, Jan. 6, 2021, section 4.

"3rd Generation Partnership Project; Technical Specification Group Radio Access Network;NR;Packet Data Convergence Protocol (PDCP) specification (Release 16)", 3GPP TS 38.323 V16.2.0, Jan. 5, 2021, section 4.

"3rd Generation Partnership Project; Technical Specification Group Radio Access Network;E-UTRA and NR;Service Data Adaptation Protocol (SDAP) specification (Release 16)", 3GPP TS 37.324 V16.2.0, Jan. 2, 2021, section 4.

* cited by examiner

400

Terminal Device

Network Device

S401-1: A terminal device receives configuration information via at least one AI functional entity and/or at least one joint AI functional entity, the at least one AI functional entity having a first association with a communication protocol sublayer of the terminal device, and the at least one joint AI functional entity having a second association with the communication protocol sublayer of the terminal device.

S401-2: A terminal device transmits configuration information via at least one AI functional entity and/or at least one joint AI functional entity, the at least one AI functional entity having a first association with a communication protocol sublayer of the terminal device, and the at least one joint AI functional entity having a second association with the communication protocol sublayer of the terminal device.

FIG. 4

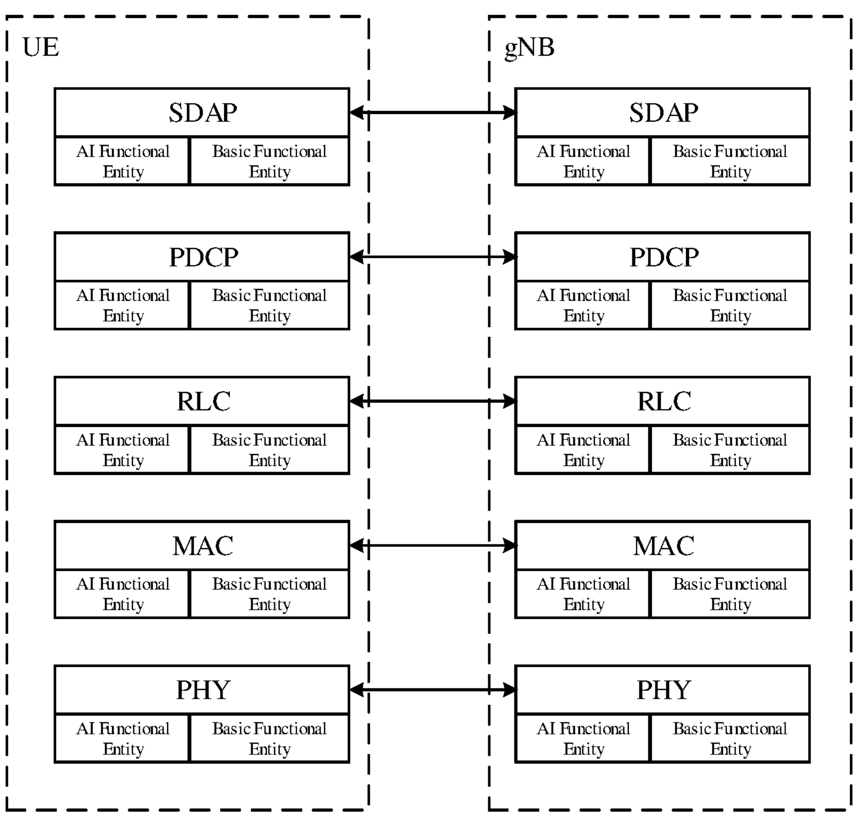

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2021/081768 filed on Mar. 19, 2021, the entire disclosure of which is incorporated herein by reference.

TECHNICAL FIELD

The embodiments of the present disclosure relate to communication technology, and more particularly, to a wireless communication method, a terminal device and a network device.

BACKGROUND

Currently, functions of communication protocol stacks of communication systems mainly rely on a configuration combination provided by a network for each communication protocol sublayer. The configuration combination provided by the network is determined based on a predefined algorithm, so it is difficult to be adjusted adaptively according to differences in geographical areas and environments. Therefore, it is difficult to meet the application requirements of complex scenarios.

SUMMARY

The embodiments of the present disclosure provide a wireless communication method, a terminal device and a network device. At least one AI functional entity and/or at least one joint AI functional entity is defined in a communication protocol stack, capable of adaptively adjusting configuration information based on actual requirements, thereby achieving intelligent optimization of the communication protocol stack and improving the performance of the communication system.

In a first aspect, a wireless communication method is provided. The method includes:

- receiving or transmitting, by a terminal device, configuration information via at least one Artificial Intelligence (AI) functional entity and/or at least one joint AI functional entity.
- the at least one AI functional entity has a first association with a communication protocol sublayer of the terminal device, and the at least one joint AI functional entity has a second association with the communication protocol sublayer of the terminal device.

In a second aspect, a wireless communication method is provided. The method includes:

- receiving or transmitting, by a network device, configuration information via at least one Artificial Intelligence (AI) functional entity and/or at least one joint AI functional entity.
- the at least one AI functional entity has a first association with a communication protocol sublayer of the network device, and the at least one joint AI functional entity has a second association with the communication protocol sublayer of the network device.

In a third aspect, a terminal device is provided. The terminal device is configured to perform the method according to the above first aspect.

In particular, the terminal device includes one or more functional modules configured to perform the method according to the above first aspect.

In a fourth aspect, a network device is provided. The network device is configured to perform the method according to the above second aspect.

In particular, the network device includes one or more functional modules configured to perform the method according to the above second aspect.

In a fifth aspect, a terminal device is provided. The terminal device includes a processor and a memory. The memory has a computer program stored thereon, and the processor is configured to invoke and execute the computer program stored in the memory to perform the method according to the above first aspect.

In a sixth aspect, a network device is provided. The network device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to any of the above first to second aspects.

In particular, the apparatus includes a processor configured to invoke and execute a computer program from a memory, to cause a device provided with the apparatus to perform the method according to any of the above first to second aspects.

In an eighth aspect, a computer-readable storage medium is provided. The computer-readable storage medium stores a computer program that causes a computer to perform the method according to any of the above first to second aspects.

In a ninth aspect, a computer program product is provided. The computer program product includes computer program instructions that cause a computer to perform the method according to any of the above first to second aspects.

In a tenth aspect, a computer program is provided. The computer program, when executed on a computer, causes the computer to perform the method according to any of the above first to second aspects.

With the above technical solutions, a terminal device or a network device can receive or transmit configuration information via at least one AI functional entity and/or at least one joint AI functional entity associated with a communication protocol sublayer. The at least one AI functional entity and/or at least one joint AI functional entity is defined in the communication protocol stack, so as to obtain appropriate configuration information in different scenarios, optimize the configuration of the communication protocol stack, and achieve the intelligent optimization of the communication protocol stack, such that the communication protocol stack can obtain the best communication performance in different application scenarios.

BRIEF DESCRIPTION OF DRAWINGS

FIG. 4 is a schematic flowchart illustrating a wireless communication method according to an embodiment of the present disclosure.

FIG. 5*a* is a schematic diagram showing an architecture of a user plane protocol stack incorporating an AI functional entity according to an embodiment of the present disclosure.

FIG. 7*a* is a schematic diagram showing an architecture of a user plane protocol stack incorporating a joint AI functional entity according to an embodiment of the present disclosure.

FIG. 7*b* is a schematic diagram showing an architecture of a control plane protocol stack incorporating a joint AI functional entity according to an embodiment of the present disclosure.

FIG. 9 is a schematic flowchart illustrating another wireless communication method according to an embodiment of the present disclosure.

FIG. 10 shows a schematic block diagram of a terminal device according to an embodiment of the present disclosure.

FIG. 11 shows a schematic block diagram of a network device according to an embodiment of the present disclosure.

DESCRIPTION OF EMBODIMENTS

Figure 1:
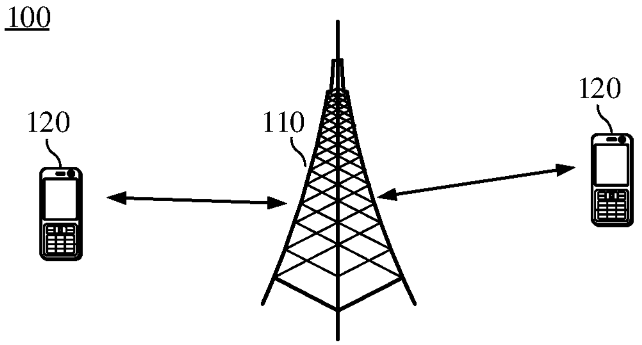
FIG. 1 is a schematic diagram showing an architecture of a communication system in which an embodiment of the present disclosure is applied.

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5$^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

In some embodiments, the communication system of an embodiment of the present disclosure may be applied to a Carrier Aggregation (CA) scenario, a Dual Connectivity (DC) scenario, a Standalone (SA) network deployment scenario, and the like.

In some embodiments, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. In some embodiments, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. In some embodiments, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. In some embodiments, the communication system 100 may include multiple network devices, and the coverage of each network device may include other numbers of terminal devices. The embodiment of the present disclosure is not limited to this.

In some embodiments, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In the 5G network environment, in order to reduce air interface signaling and quickly restore wireless connections and data services, a new Radio Resource Control (RRC) state is defined, RRC_INACTIVE state. This state is different from RRC_IDLE and RRC_CONNECTED states. In the RRC_IDLE state, mobility is UE-based cell selection and reselection, paging is initiated by a Core Network (CN), and the paging area is configured by the CN. There is no UE Access Stratum (AS) context at the base station, and there is no RRC connection. In the RRC_CONNECTED state, there is an RRC connection, and the base station and the UE have the UE AS context. The network device knows the location of the UE at the specific cell level. Mobility is mobility controlled by network device. Unicast data can be transmitted between the UE and the base station. In the RRC_INACTIVE state, mobility is UE-based cell selection and reselection, there is a connection between CN-NR, there is UE AS context on a certain base station, paging is triggered by a Radio Access Network (RAN), and RAN-based paging area is managed by the RAN, and the network device knows the location of the UE at the RAN-based paging area level.

In order to better understand the embodiments of the present disclosure, the user plane protocol stack and the control plane protocol stack in the NR system related to the present disclosure will be described.

In the NR system, user plane protocols and control plane protocols correspond to different protocol stacks and are applied to different processes.

Figure 2:
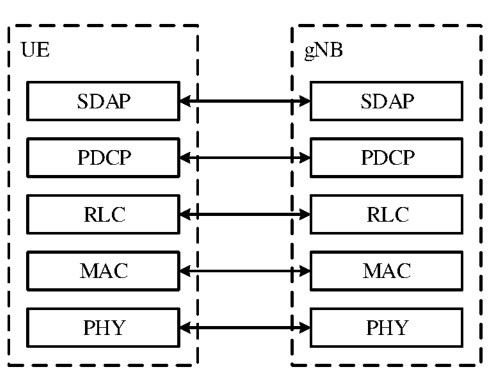
FIG. 2 is a schematic diagram of a user plane protocol stack according to the present disclosure.

As shown in FIG. 2, the user plane protocol stack includes five sublayers, Service Data Adaptation Protocol (SDAP), Packet Data Convergence Protocol (PDCP), Radio Link Control (RLC), Media Access Control (MAC) and Physical (PHY) layer. Each sublayer of a terminal device is communicatively connected to the corresponding sublayer of a base station, and the function of each sublayer is introduced as follows.

SDAP: It is mainly responsible for mapping user plane data Quality of Service (QoS) flows from a higher layer to corresponding Data Radio Bearers (DRBs) or disassembling user plane data of DRBs into QoS flows for submitting to the higher layer.

PDCP: It is mainly responsible for header compression/decompression, encryption and decryption, integrity protection, reordering and the like of user plane data.

RLC: It is mainly responsible for segmentation/concatenating of user plane data, Automatic Repeat-reQuest (ARQ) and the like.

MAC: It is mainly responsible for scheduling and multiplexing/demultiplexing of user plane data, Hybrid Automatic Repeat reQuest (HARQ), random access procedure and the like.

PHY: It is mainly responsible for encoding/decoding, multiplexing/demodulating, transmitting/receiving and the like of user plane data.

Figure 3:
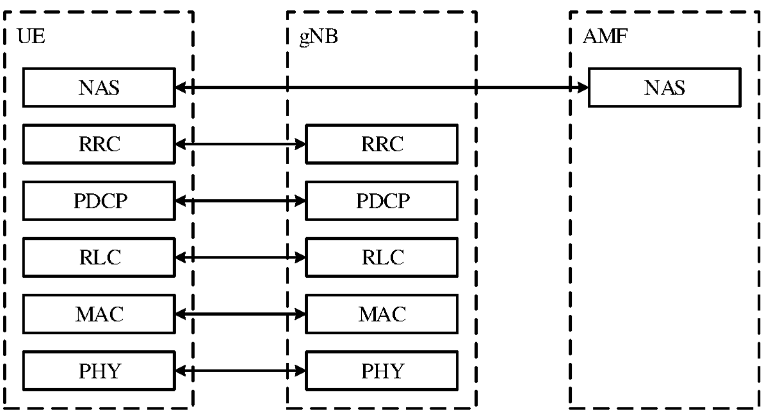
FIG. 3 is a schematic diagram of a control plane protocol stack according to the present disclosure.

As shown in FIG. 3, the control plane protocol stack includes the following sublayers: Non-access stratum (NAS), RRC, PDCP, RLC, MAC, and PHY. Here, the NAS layer of the terminal device is communicatively connected to an Access and Mobility Management Function (AMF) entity, and the other sublayers of the terminal device are communicatively connected to the corresponding sublayers of the base station, respectively. The function of each sublayer is introduced as follows.

NAS: It is mainly responsible for transmitting and receiving of control plane NAS data.

RRC: It is mainly responsible for transmitting and receiving of control plane signaling of each layer, such as: generating control instructions for RRC, SDAP, PDCP, RLC, MAC and PHY layers.

PDCP: It is mainly responsible for header compression/decompression, encryption and decryption, integrity protection, reordering and the like of control plane data.

RLC: It is mainly responsible for the segmentation/concatenating of control plane data, ARQ and the like.

MAC: It is mainly responsible for scheduling and multiplexing/demultiplexing of control plane data, HARQ, random access procedure and the like.

PHY: It is mainly responsible for encoding/decoding, multiplexing/demodulating, transmitting/receiving and the like of control plane data.

In order to facilitate better understanding of the embodiments of the present disclosure, the Artificial Intelligence (AI) technology related to the present disclosure will be described.

For all types of data in actual application scenarios, such as navigation data, shopping data, health data, communication data, etc., a large amount of data can reflect some potential features or characteristics of somethings to a certain extent, so as to provide instructive input for our subsequent technical improvements. AI technology is also one of the cutting-edge technologies based on big data. By designing AI algorithms, we can achieve intelligence in many scenarios, such as AI-controlled smart home systems, AI-based navigation systems, etc. Although the application scenarios that can be optimized with AI are highly diversified, there is no general algorithm that can be applied to all application scenarios.

The use of AI technology needs to be combined with the characteristics of the application scenario itself to achieve an optimized effect specific to the scenario. This is also the essence of the AI technology.

The functions of the existing communication system protocol stack are relatively fixed and not flexible enough. The configuration combination of respective sublayers basically depends on the implementation of the network, resulting in huge differences in performance between different manufacturers. On the other hand, even for the same manufacturer, the algorithm design typically uses the principle of design in advance. This mode of placing hopes on designing algorithms in advance cannot solve all problems encountered in actual scenarios, and the subsequent cost of human maintenance is non-negligible. Therefore, it is difficult for the existing configured semi-fixed protocol stack design rules to meet the application requirements of complex scenarios and the company's after-sales requirements.

The configuration of the traditional communication protocol sublayer is inflexible, and can generally be divided into static configuration and semi-static configuration. For the static configuration, it is generally a default configuration in the protocol and cannot be changed. For the semi-static configuration, it can typically be updated based on signaling. However, this update scheme is typically based on some predefined algorithms. If the predefined algorithms are designed unreasonably, it will take a lot of manpower and material resources to optimize the algorithms, and the optimization effect and cost will be uncontrollable. More importantly, the actual communication environment varies greatly depending on different geographical environments, and the same set of optimization algorithms cannot be applied to all scenarios to be optimized. In this case the effects of the operator's optimization algorithms will be further reduced, which is not conducive to the long-term development of the communication system.

In view of the above content, it can be seen that in the related art, the network provides configurations for protocol stacks of the communication system, such that the protocol stacks of the communication system can implement corresponding functions. However, the configuration combination provided by the network is determined based on a predefined algorithm, which cannot be adjusted adaptively with different actual application scenarios.

Based on the above problems, the present disclosure provides a protocol stack configuration scheme. At least one AI functional entity and/or at least one joint AI functional entity is defined in a communication protocol stack, which can obtain appropriate configuration information in different scenarios, such that the communication protocol stack can be adapted to different application scenarios, and the best communication performance can be obtained in different geographical areas and environments.

The technical solutions of the present disclosure will be described in detail below with reference to specific embodiments.

FIG. 4 is a schematic flowchart illustrating a wireless communication method 400 according to an embodiment of the present disclosure. As shown in FIG. 4, the method 400 may include at least part of the following content.

At S410-1, a terminal device receives configuration information via at least one AI functional entity and/or at least one joint AI functional entity. The at least one AI functional entity has a first association with a communication protocol sublayer of the terminal device, and the at least one joint AI functional entity has a second association with the communication protocol sublayer of the terminal device.

At S410-2, a terminal device receives configuration information via at least one AI functional entity and/or at least one joint AI functional entity. The at least one AI functional entity has a first association with a communication protocol sublayer of the terminal device, and the at least one joint AI functional entity has a second association with the communication protocol sublayer of the terminal device.

It should be noted that in this embodiment, the action at S410-1 and the action at S410-2 correspond to the scenarios where the terminal device receives and transmits the configuration, respectively. The action at S410-2 is optional, and thus the action at S410-2 is represented by a dotted line in FIG. 4.

The action at S410-1 will be described as follows.

The configuration information received by the terminal device via the at least one AI functional entity and/or the at least one joint AI functional entity can be determined by a basic functional entity of a network device based on a predefined algorithm, or can be determined by the network device based on an AI functional entity and/or a joint AI functional entity associated with the communication protocol sublayer at the network device.

The action at S410-2 will be described as follows.

The configuration information transmitted by the terminal device via the at least one AI functional entity and/or the at least one joint AI functional entity can be determined by a basic functional entity of the terminal device based on a predefined algorithm, or can be determined by the terminal device based on the at least one AI functional entity and/or the at least one joint AI functional entity.

In some embodiments, the communication protocol sublayer may include, but not limited to, at least one of:

NAS layer, SDAP layer, RRC layer, PDCP layer, RLC layer, MAC layer, PHY layer, or Backhaul Adaptation Protocol (BAP) layer.

The basic functions of each layer will be introduced as follows.

NAS: It is mainly responsible for transmitting and receiving of control plane NAS data.

SDAP: It is mainly responsible for mapping user plane data QoS flows from a higher layer to corresponding DRBs or disassembling user plane data of DRBs into QoS flows for submitting to the higher layer.

RRC: It is mainly responsible for transmitting and receiving of control plane signaling of each layer, such as: generating control instructions for RRC, SDAP, PDCP, RLC, MAC and PHY layers.

PDCP: It is mainly responsible for header compression/decompression, encryption and decryption, integrity protection, reordering and the like of control plane/user plane data.

RLC: It is mainly responsible for the segmentation/concatenating of control plane/user plane data, ARQ and the like.

MAC: It is mainly responsible for scheduling and multiplexing/demultiplexing of control plane/user plane data, HARQ, random access procedure and the like.

PHY: It is mainly responsible for encoding/decoding, multiplexing/demodulating, transmitting/receiving and the like of control plane/user plane data.

BAP: It is mainly responsible for routing of control plane/user plane data, address addition, addressing and the like.

The embodiments of the present disclosure can be divided into at least the following three possible implementations according to different functional entities of the terminal device for receiving or transmitting the configuration information: Implementation 1 where the terminal device receives or transmits the configuration information via at least one AI functional entity; Implementation 2 where the terminal device receives or transmits the configuration information via at least one joint AI functional entity; and Implementation 3 where the terminal device receives or transmits the configuration information via at least one AI functional entity and at least one joint AI functional entity.

Firstly, Implementation 1 will be described with reference to FIG. 5*a* to FIG. 6*b*.

In some embodiments, the at least one AI functional entity of the terminal device may be a part of its corresponding communication protocol sublayer, or the at least one AI functional entity may be independent of its corresponding communication protocol sublayer.

In some embodiments, in the first association, a one-to-one correspondence holds between AI functional entities and communication protocol sublayers, a one-to-multiple correspondence holds between AI functional entities and communication protocol sublayers, a multiple-to-one correspondence holds between AI functional entities and communication protocol sublayers, or a multiple-to-multiple correspondence holds between AI functional entities and communication protocol sublayers.

Figures 5B, 6A, 6B:
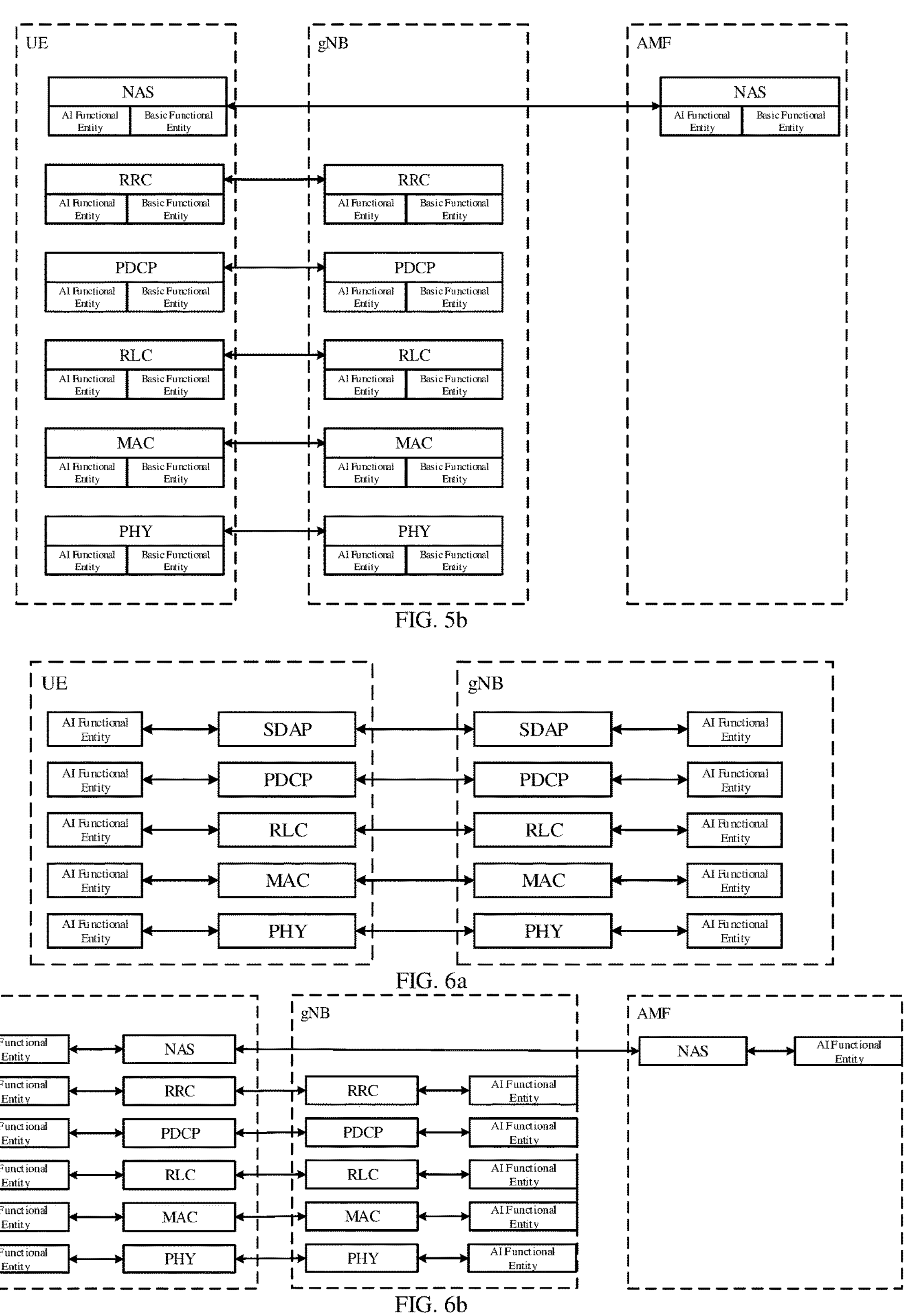
FIG. 5*b* is a schematic diagram showing an architecture of a control plane protocol stack incorporating an AI functional entity according to an embodiment of the present disclosure.
FIG. 6*a* is a schematic diagram showing an architecture of another user plane protocol stack incorporating an AI functional entity according to an embodiment of the present disclosure.
FIG. 6*b* is a schematic diagram showing an architecture of another control plane protocol stack incorporating an AI functional entity according to an embodiment of the present disclosure.

FIG. 5*a* and FIG. 5*b* will be explained by taking the AI functional entity being its corresponding communication protocol sublayer as an example.

Referring to FIG. 5*a*, in the user plane protocol stack, the communication protocol sublayer associated with the AI functional entity in the terminal device includes at least one of: SDAP layer, PDCP layer, RLC layer, MAC layer, PHY layer, or BAP layer.

Each of the SDAP layer, PDCP layer, RLC layer, MAC layer, and PHY layer in FIG. 5*a* is associated with an AI functional entity.

The possible first association not shown in FIG. 5*a* may further include a one-to-multiple correspondence between AI functional entities and communication protocol sublayers, i.e., at least one of the at least one AI functional entity is associated with at least two communication protocol sublayers. For example, the SDAP layer and the PDCP layer may be associated with an AI functional entity, the RLC layer may be associated with an AI functional entity, and the MAC layer and the PHY layer may be associated with an AI functional entity. An AI functional entity can be associated with any number of communication protocol sublayers, and the communication protocol sublayers associated with the same AI functional entity can be combined arbitrarily, and the present disclosure is not limited to this.

The possible first association not shown in FIG. 5*a* may further include a multiple-to-one correspondence between AI functional entities and communication protocol sublayers, i.e., at least one of the at least one communication protocol sublayer is associated with at least two AI functional entities. For example, two AI functional entities may be associated with the SDAP layer. A communication protocol sublayer can be associated with any number of AI functional entities, and the present disclosure is not limited to this.

The possible first association not shown in FIG. 5*a* may further include a multiple-to-multiple correspondence between AI functional entities and communication protocol sublayers, i.e., each AI functional entity is associated with multiple communication protocol sublayers, and each communication protocol sublayer is associated with multiple AI functional entities.

In FIG. 5*a*, there may be a protocol link between the AI functional entities included in counterpart communication protocol sublayers of the network device and the terminal device. For example, the AI functional entity associated with the MAC layer of the network device and the AI functional entity associated with the MAC layer of the terminal device can communicate with each other via the associated communication protocol sublayers, or the AI functional entity associated with the MAC layer of the network device can communicate with the AI functional entity associated with the MAC layer of the terminal device (not shown in FIG. 5*a*), and the present disclosure is not limited to this.

It should be noted that the protocol link between the AI functional entities included in counterpart communication protocol sublayers of the network device and the terminal device may be a logical connection, and the communication between the network device and the terminal device can be achieved via an air interface.

Referring to FIG. 5*b*, in the control plane protocol stack, the communication protocol sublayer associated with the AI functional entity in the terminal device includes at least one of: NAS layer, RRC layer, PDCP layer, RLC layer, MAC layer, PHY layer, or BAP layer.

Each of the NAS layer, RRC layer, PDCP layer, RLC layer, MAC layer, and PHY layer in FIG. 5*b* is associated with an AI functional entity.

In this embodiment, the first association between the NAS layer, the RRC layer, the PDCP layer, the RLC layer, the MAC layer, and the PHY layer and the at least one AI functional entity may further include the first association not shown in FIG. 5*b*, including a one-to-multiple correspondence between AI functional entities and communication protocol sublayers; a multiple-to-one correspondence between AI functional entities and communication protocol sublayers; and a multiple-to-multiple correspondence between AI functional entities and communication protocol sublayers. Its specific implementation is similar to the above embodiment shown in FIG. 5*a*, and details thereof will be omitted here.

In FIG. 5*b*, there may be a protocol link between the AI functional entities associated with counterpart communication protocol sublayers of the network device and the terminal device. For example, the AI functional entity associated with the MAC layer of the network device and the AI functional entity associated with the MAC layer of the terminal device can communicate with each other via the associated communication protocol sublayers, or the counterpart communication protocol sublayers corresponding to the network device and the terminal device can communicate with each other via the included AI functional entities (not shown in FIG. 5*b*), and the present disclosure is not limited to this.

Exemplarily, the network device in FIG. 5*b* may include a base station and a core network. Here, there may be a protocol link between the NAS layer of the terminal device and the NAS layer of the core network, or there may be a protocol link between the AI functional entity associated with the NAS layer of the terminal device and the AI functional entity associated with the NAS layer of the core network. There may be protocol links between the RRC layer, PDCP layer, RLC layer, MAC layer, and PHY layer of the terminal device and the corresponding communication sublayers of the base station, respectively.

FIG. 6*a* and FIG. 6*b* will be explained by taking the AI functional entity being independent of its corresponding communication protocol sublayer as an example.

Referring to FIG. 6*a*, in the user plane protocol stack, at least one AI functional entity associated with each communication protocol sublayer of the SDAP layer, PDCP layer, RLC layer, MAC layer, and PHY layer is independent of its corresponding communication protocol sublayer. There is a data interaction interface between each AI functional entity and its associated communication protocol sublayer for data interaction.

The first association between the communication protocol sublayer and the at least one AI functional entity is similar to that in the embodiment shown in FIG. 5*a*, and details thereof will be omitted here.

In FIG. 6*a*, there may be a protocol link between the AI functional entities associated with counterpart communication protocol sublayers of the network device and the terminal device. For example, the AI functional entity associated with the MAC layer of the network device and the AI functional entity associated with the MAC layer of the terminal device can communicate with each other via the associated communication protocol sublayers, or the AI functional entity associated with the MAC layer of the network device can communicate with the AI functional entity associated with the MAC layer of the terminal device (not shown in FIG. 6*a*), and the present disclosure is not limited to this.

It should be noted that the protocol link between the AI functional entities associated with counterpart communication protocol sublayers of the network device and the terminal device may be a logical connection, and the communication between the network device and the terminal device can be achieved via an air interface.

Referring to FIG. 6*b*, in the control plane protocol stack, at least one AI functional entity associated with each communication protocol sublayer of the NAS layer, RRC layer, PDCP layer, RLC layer, MAC layer, PHY layer, and BAP layer is independent of its corresponding communication protocol sublayer. There is a data interaction interface between each AI functional entity and its associated communication protocol sublayer for data interaction.

The first association between the communication protocol sublayer and the at least one AI functional entity is similar to that in the embodiment shown in FIG. 5*b*, and details thereof will be omitted here.

In FIG. 6*b*, there may be a protocol link between the AI functional entities associated with counterpart communication protocol sublayers of the network device and the terminal device. For example, the AI functional entity associated with the MAC communication protocol sublayer of the network device and the AI functional entity associated with the MAC communication protocol sublayer of the terminal device can communicate with each other via the associated communication protocol sublayers, or the counterpart communication protocol sublayers corresponding to the network device and the terminal device can communicate with each other via the included AI functional entities (not shown in FIG. 6*b*), and the present disclosure is not limited to this.

Exemplarily, the network device in FIG. 6*b* may include a base station and a core network. Here, there may be a protocol link between the NAS layer of the terminal device and the NAS layer of the core network, or there may be a protocol link between the AI functional entity associated with the NAS layer of the terminal device and the AI functional entity associated with the NAS layer of the core network. There may be protocol links between the RRC layer, PDCP layer, RLC layer, MAC layer, and PHY layer of the terminal device and the corresponding communication sublayers of the base station, respectively.

The above Implementation 2 will be described below with reference to FIG. 7*a* and FIG. 7*b*.

In some embodiments, the at least one joint AI functional entity may be a part of its corresponding communication protocol sublayer, or the at least one joint AI functional entity may be independent of its corresponding communication protocol sublayer.

In some embodiments, in the second association, a one-to-one correspondence holds between joint AI functional entities and communication protocol sublayers, a one-to-multiple correspondence holds between joint AI functional entities and communication protocol sublayers, a multiple-to-one correspondence holds between joint AI functional entities and communication protocol sublayers, or a multiple-to-multiple correspondence holds between joint AI functional entities and communication protocol sublayers.

Referring to FIG. 7*a*, in the user plane protocol, the communication protocol sublayer associated with the at least one joint AI functional entity in the terminal device includes at least one of: SDAP layer, PDCP layer, RLC layer, MAC layer, PHY layer, or BAP layer.

The SDAP layer, PDCP layer, RLC layer, MAC layer, and PHY layer in FIG. 7*a* are jointly associated with one joint AI functional entity. The possible second association not shown in FIG. 7*a* may further include: a one-to-one correspondence between joint AI functional entities and communication protocol sublayers; a multiple-to-one correspondence between joint AI functional entities and communication protocol sublayers; or a multiple-to-multiple correspondence between joint AI functional entities and communication protocol sublayers. The specific example is similar to the first association between AI functional entities and communication protocol sublayers in the above embodiment, and details thereof will be omitted here.

In FIG. 7*a*, there may be a protocol link between the joint AI functional entities associated with counterpart communication protocol sublayers of the network device and the terminal device. For example, the joint AI functional entity associated with the MAC layer of the network device and the joint AI functional entity associated with the MAC layer of the terminal device can communicate with each other via the associated communication protocol sublayers, or the joint AI functional entity associated with the MAC layer of the network device can communicate with the joint AI functional entity associated with the MAC layer of the terminal device (not shown in FIG. 7*a*), and the present disclosure is not limited to this.

It should be noted that the protocol link between the joint AI functional entities associated with counterpart communication protocol sublayers of the network device and the terminal device may be a logical connection, and the communication between the network device and the terminal device can be achieved via an air interface.

In some embodiments, the at least one joint AI functional entity of the terminal device can communicate with the at least one peer AI functional entity of the network device.

Referring to FIG. 7*b*, in the control plane protocol stack, the communication protocol sublayer associated with the joint AI functional entity in the terminal device includes at least one of: NAS layer, RRC layer, PDCP layer, RLC layer, MAC layer, PHY layer, or BAP layer.

The NAS layer, RRC layer, PDCP layer, RLC layer, MAC layer, and PHY layer in FIG. 7*b* are jointly associated with a joint AI functional entity.

In this embodiment, the second association between the NAS layer, the RRC layer, the PDCP layer, the RLC layer, the MAC layer, and the PHY layer and the at least one joint AI functional entity may further include the second association not shown in FIG. 7*b*: including a one-to-one correspondence between joint AI functional entities and communication protocol sublayers; a multiple-to-one correspondence between joint AI functional entities and communication protocol sublayers; and a multiple-to-multiple correspondence between joint AI functional entities and communication protocol sublayers. Its specific implementation is similar to the above embodiment shown in FIG. 5*b*, and details thereof will be omitted here.

In FIG. 7*b*, there may be a protocol link between the joint AI functional entities associated with counterpart communication protocol sublayers of the network device and the terminal device. For example, the joint AI functional entity associated with the MAC layer of the network device and the joint AI functional entity associated with the MAC layer of the terminal device can communicate with each other via the associated communication protocol sublayers, or the counterpart communication protocol sublayers corresponding to the network device and the terminal device can communicate with each other via the associated joint AI functional entities (not shown in FIG. 7*b*), and the present disclosure is not limited to this.

Exemplarily, the network device in FIG. 7*b* may include a base station and a core network. Here, there may be a protocol link between the NAS layer of the terminal device and the NAS layer of the core network, or there may be a protocol link between the joint AI functional entity associated with the NAS layer of the terminal device and the joint AI functional entity associated with the NAS layer of the core network. There may be protocol links between the RRC layer, PDCP layer, RLC layer, MAC layer, and PHY layer of the terminal device and the corresponding communication sublayers of the base station, respectively.

In some embodiments, the at least one joint AI functional entity of the terminal device can communicate with the at least one peer joint AI functional entity of the network device.

In the embodiments shown in FIG. 7*a* and FIG. 7*b*, the dotted line indicates that the communication interface may not exist.

The above Implementation 3 will be described below with reference to FIG. 8*a* to FIG. 8*f*.

In some embodiments, the at least one AI functional entity of the terminal device may have a third association with the at least one joint AI functional entity.

In some embodiments, in the third association, a multiple-to-one correspondence holds between AI functional entities and joint AI functional entities, or a multiple-to-multiple correspondence holds between AI functional entities and joint AI function entities.

In some embodiments, the at least one joint AI functional entity may include the at least one AI functional entity, or the at least one joint AI functional entity may be independent of the at least one AI functional entity.

Figure 8A:
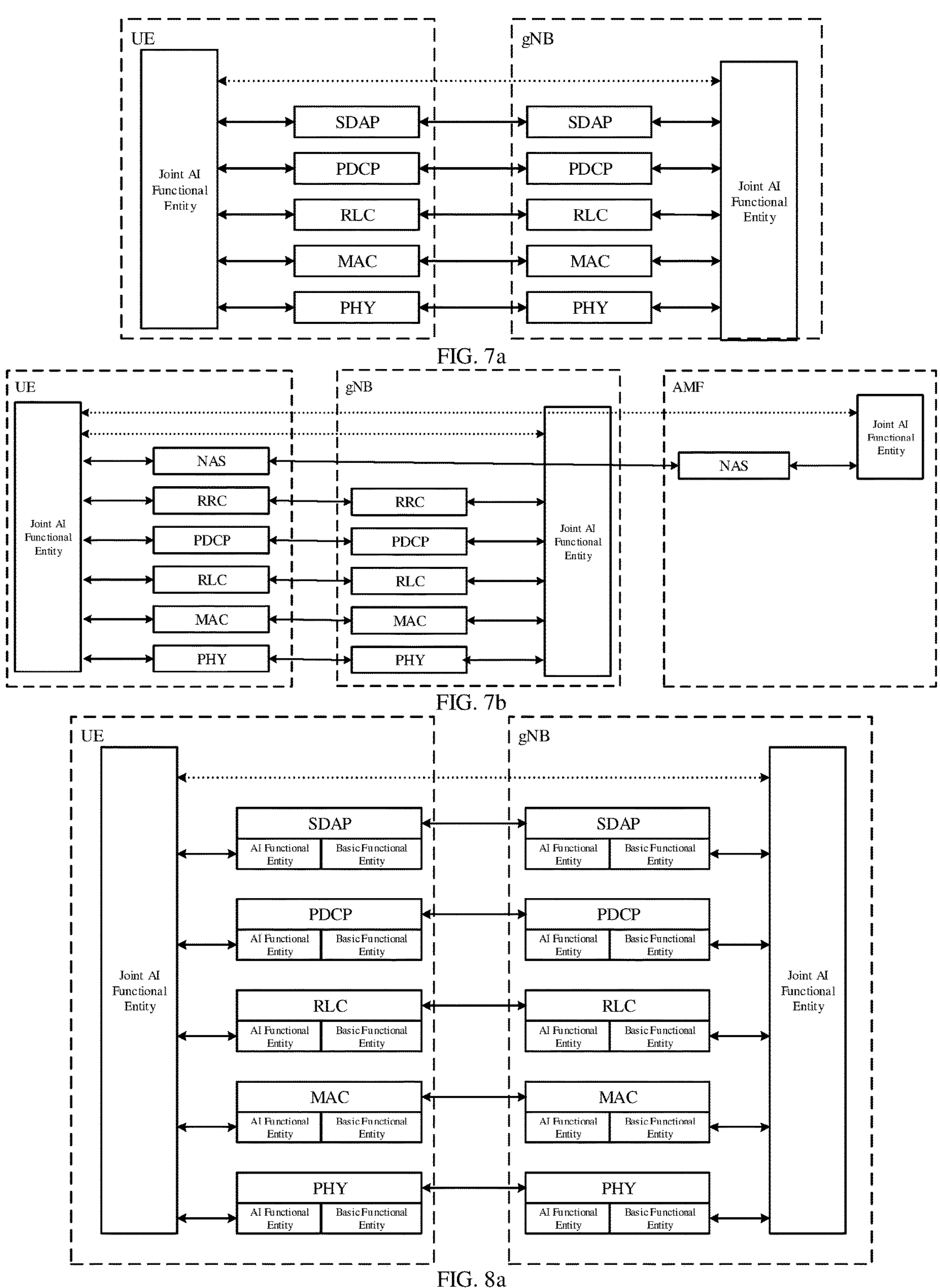
FIG. 8*a* is a schematic diagram showing an architecture of a user plane protocol stack incorporating an AI functional entity and a joint AI functional entity according to an embodiment of the present disclosure.

Referring to FIG. 8*a*, at least one AI functional entity in the user plane protocol stack of the terminal device is its associated communication protocol sublayer, and the joint AI functional entity has a one-to-multiple correspondence with the at least one AI functional entity. Here, the association between the AI functional entity and the communication protocol sublayer may be any one of the first associations in the above embodiment. This embodiment will be described taking the first association in the embodiment shown in FIG. 5*a* as an example.

It should be noted that multiple AI functional entities may be associated with one joint AI functional entity, such that the AI functional entities included in respective communication protocol sublayers can be combined or cooperate with each other. In other words, the main function of the joint AI functional entity is to coordinate data interaction between the AI functional entities included in the respective communication protocol sublayers, thereby achieving joint optimization of configuration of multiple communication protocol sublayers. FIG. 8*a* is described with reference to only an example where the AI functional entities included in all the communication protocol sublayers are associated with one joint AI functional entity. The present disclosure does not rule out multiple-to-multiple or multiple-to-one association between the at least one AI functional entity and the at least one joint AI functional entity.

In FIG. 8*a*, there may be a protocol link between counterpart joint AI functional entities of the network device and the terminal device, and the joint AI functional entity of the network device can communicate with the joint AI functional entity of the terminal device, or the joint AI functional entity of the terminal device can communicate with the at least one AI functional entity of the network device, or the joint AI functional entity of the terminal device can communicate with the communication protocol sublayer of the network device, and the present disclosure is not limited to this.

Figures 8B, 8C, 8D:
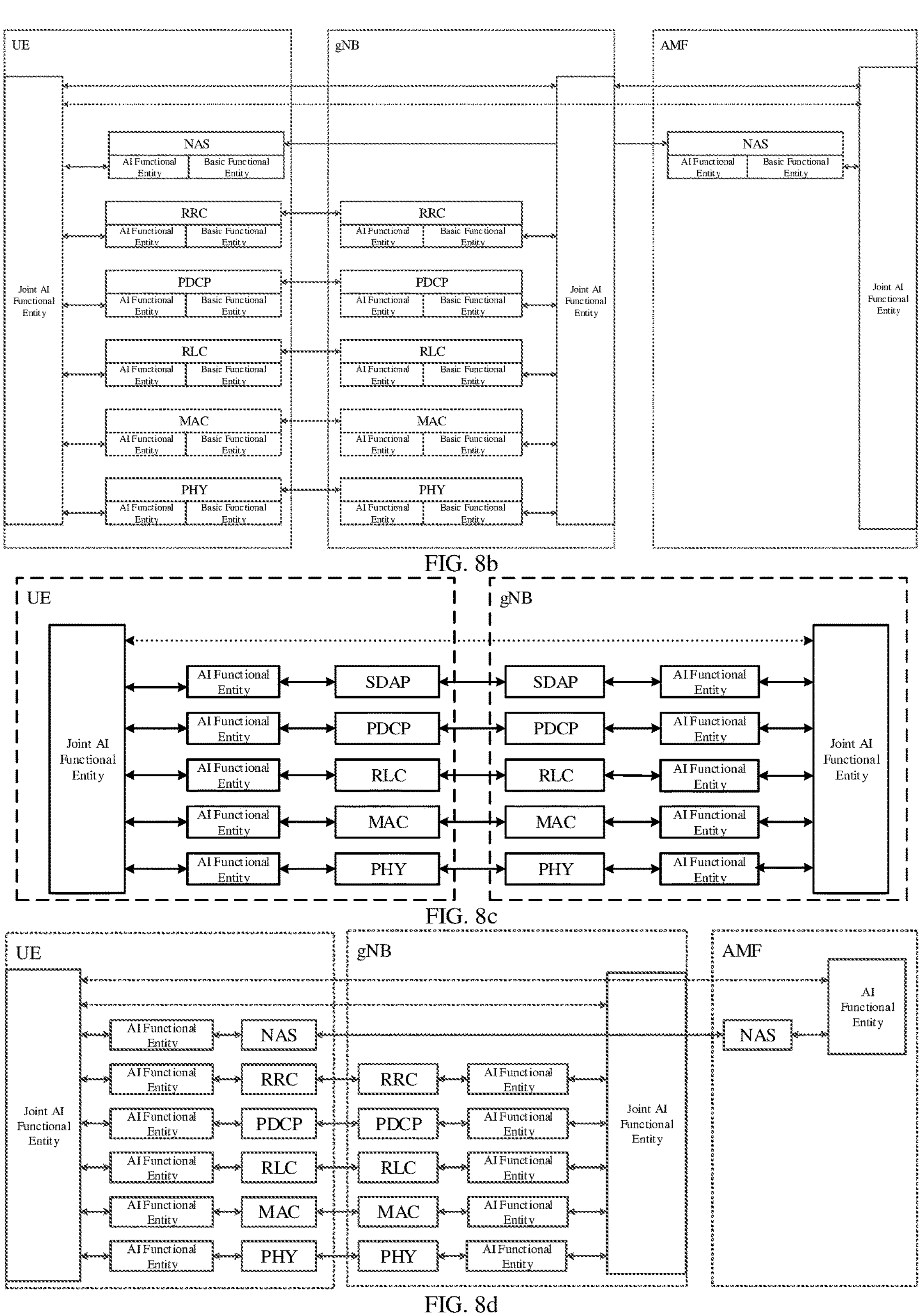
FIG. 8*b* is a schematic diagram showing an architecture of a control plane protocol stack incorporating an AI functional entity and a joint AI functional entity according to an embodiment of the present disclosure.
FIG. 8*c* is a schematic diagram showing an architecture of another user plane protocol stack incorporating an AI functional entity and a joint AI functional entity according to an embodiment of the present disclosure.
FIG. 8*d* is a schematic diagram showing an architecture of another control plane protocol stack incorporating an AI functional entity and a joint AI functional entity according to an embodiment of the present disclosure.

The embodiment shown in FIG. 8*b* is based on the embodiment shown in FIG. 5*b*, with a joint AI functional entity associated with the AI functional entity added in the control plane protocol stack. In the embodiment shown in FIG. 8*b*, the correspondence between the joint AI functional entity and the AI functional entity and the functions to be implemented by the joint AI functional entity are similar to those in the embodiment shown in FIG. 8*a*, and details thereof will be omitted here.

The embodiment shown in FIG. 8*c* is based on the embodiment shown in FIG. 6*a*, with a joint AI functional entity associated with the AI functional entity added to the user plane protocol stack. In the embodiment shown in FIG. 8*c*, the correspondence between the joint AI functional entity and the AI functional entity and the functions to be implemented by the joint AI functional entity are similar to those in the embodiment shown in FIG. 8*a*, and details thereof will be omitted here.

The embodiment shown in FIG. 8*d* is based on the embodiment shown in FIG. 6*b*, with a joint AI functional entity associated with the AI functional entity added in the control plane protocol stack. In the embodiment shown in FIG. 8*d*, the correspondence between the joint AI functional entity and the AI functional entity and the functions to be implemented by the joint AI functional entity are similar to those in the embodiment shown in FIG. 8*a*, and details thereof will be omitted here.

In any of the above embodiments shown in FIG. 8*a* to FIG. 8*d*, the at least one joint AI functional entity is independent of the at least one AI functional entity. For the case where the at least one joint AI functional entity includes the at least one AI functional entity, examples as shown in FIG. 8*e* and FIG. 8*f* are provided.

Figure 8E:
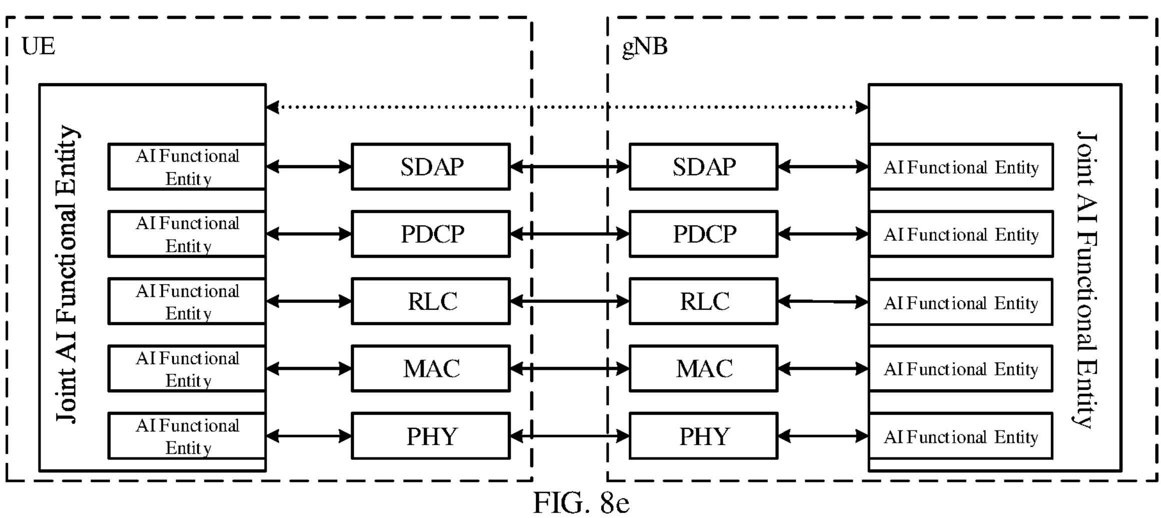
FIG. 8*e* is a schematic diagram showing an architecture of yet another user plane protocol stack incorporating an AI functional entity and a joint AI functional entity according to an embodiment of the present disclosure.

Referring to FIG. 8*e*, on the basis of the embodiment shown in FIG. 5*a*, at least one AI functional entity in the user plane protocol stack is independent of the associated communication protocol sublayer, and the at least one AI functional entity is included in at least one associated joint AI functional entity.

FIG. 8*e* is described with reference to only an example where the AI functional entities associated with all the communication protocol sublayers are included in one joint AI functional entity. The present disclosure does not rule out multiple-to-multiple or multiple-to-one association between the at least one AI functional entity and the at least one joint AI functional entity.

Figure 8F:
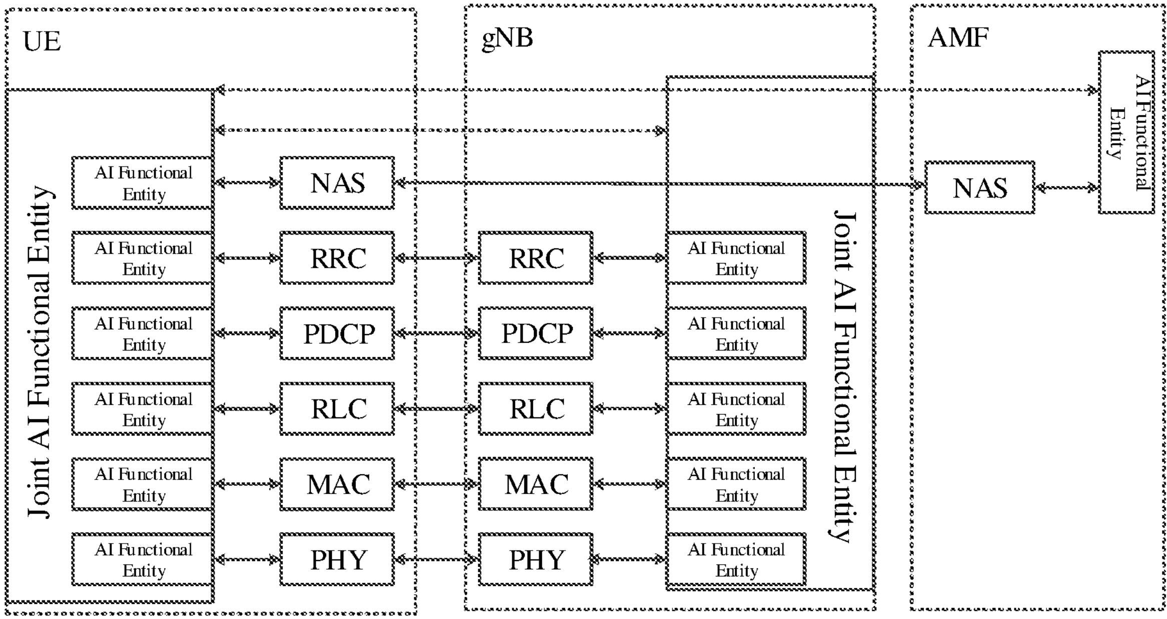
FIG. 8*f* is a schematic diagram showing an architecture of yet another control plane protocol stack incorporating an AI functional entity and a joint AI functional entity according to an embodiment of the present disclosure.

The embodiment shown in FIG. 8*f* is based on the embodiment shown in FIG. 5*b*, with a joint AI functional entity associated with the AI functional entity added in the control plane protocol stack, and the joint AI functional entity includes the associated AI functional entity. In the embodiment shown in FIG. 8*f*, the correspondence between the joint AI functional entity and the AI functional entity and the functions to be implemented by the joint AI functional entity are similar to those in the embodiment shown in FIG. 8*e*, and details thereof will be omitted here.

In the embodiments shown in FIG. 8*a* to FIG. 8*f*, the dotted line indicates that the communication interface may not exist.

In some embodiments, the terminal device may receive instruction information to activate or deactivate or reconfigure the at least one AI functional entity and/or at least one joint AI functional entity of the terminal device.

In some embodiments, the instruction information may be transmitted by at least one of: a network device (including a core network device and/or an access network device), an Operation Administration and Maintenance (OAM) device, or an AI control device.

In some embodiments, the instruction information to activate or deactivate or reconfigure the at least one AI functional entity and/or at least one joint AI functional entity may be carried by a dedicated message or a common message. Here, the dedicated message or common message may be an existing message with an AI function extension, or may be a new dedicated message or common message defined specifically for the at least one AI functional entity and/or at least one joint AI functional entity. The dedicated message can be at least one of an AI message, an RRC message, a MAC CE instruction, a DCI instruction, a paging message, or a short paging message, and the common message may be at least one of a system broadcast/multicast/multicast message or an interface common message, and the present disclosure is not limited to this.

In some embodiments, the instruction information to activate or reconfigure the at least one AI functional entity and/or at least one joint AI functional entity may further include control configuration information for the AI functional entity and/or the joint AI functional entity.

In some embodiments, the control configuration information may include, but not limited to, at least one of the following information:

- an algorithm configuration for the AI functional entity and/or the joint AI functional entity, an application scenario configuration for the AI functional entity and/or the joint AI functional entity, or an optimization target configuration for an application scenario for the AI functional entity and/or the joint AI functional entity.

Here, the optimization target configuration for the configuration scenario may include information such as a type and number of required input parameters, a type and number of required output parameters, and a data processing rule.

Exemplarily, the instruction information may be transmitted by at least one AI functional entity and/or at least one joint AI functional entity of the network device, or may be transmitted by each communication protocol sublayer via signaling. Correspondingly, the configuration information may be received by at least one AI functional entity and/or at least one joint AI functional entity of the terminal device, or by each communication protocol sublayer of the terminal device via signaling, and the present disclosure is not limited to this.

In some embodiments, when a type of configuration information received or generated by the at least one AI functional entity and/or the at least one joint AI functional entity is same as a type of a configuration received or generated or stored by the corresponding communication protocol sublayer, the terminal device may use the configuration received or generated by the at least one AI functional entity and/or the at least one joint AI functional entity based on a protocol or implementation or the configuration received or generated or stored by the corresponding communication protocol sublayer based on a protocol or implementation; and/or when the type of the configuration information received or generated by the at least one AI functional entity and/or the at least one joint AI functional entity is different from the type of the configuration received or generated or stored by the corresponding communication protocol sublayer, the terminal device may use the configuration information received or generated or stored by the communication protocol sublayer.

It should be noted that, in the terminal device or the network device, the configuration information generated by the AI functional entity and/or the joint AI functional entity is the configuration information that needs to be applied by each communication protocol sublayer, and each communication protocol sublayer itself also maintains the same or similar configuration type of configuration information transmitted by each communication protocol sublayer of the network device. Then, the same or similar configuration type of configuration information from two different entities (one from the AI functional entity and/or joint AI functional entity, and the other from each communication protocol sublayer) needs to follow priorities specified in the protocol when used. For example, the configuration information generated by the AI functional entity and/or the joint AI functional entity may always have a higher priority than the same or similar configuration information generated by each communication protocol sublayer, but when the configuration information generated by the AI functional entity and/or the joint AI functional entity becomes invalid due to e.g., synchronization, both the terminal device and the network device can only use the same or similar configuration type of configuration information generated by each communication protocol sublayer. Of course, it may be possible to reverse the logic of the above application configuration, and the method is not limited to this.

Therefore, in the embodiment of the present disclosure, the terminal device can receive or transmit configuration information via at least one AI functional entity and/or at least one joint AI functional entity associated with a communication protocol sublayer. The at least one AI functional entity and/or at least one joint AI functional entity is defined in the communication protocol stack, so as to obtain appropriate configuration information in different scenarios, optimize the configuration of the communication protocol stack, and achieve the intelligent optimization of the communication protocol stack, such that the communication protocol stack can obtain the best communication performance in different application scenarios.

Figures 9, 10, 11:
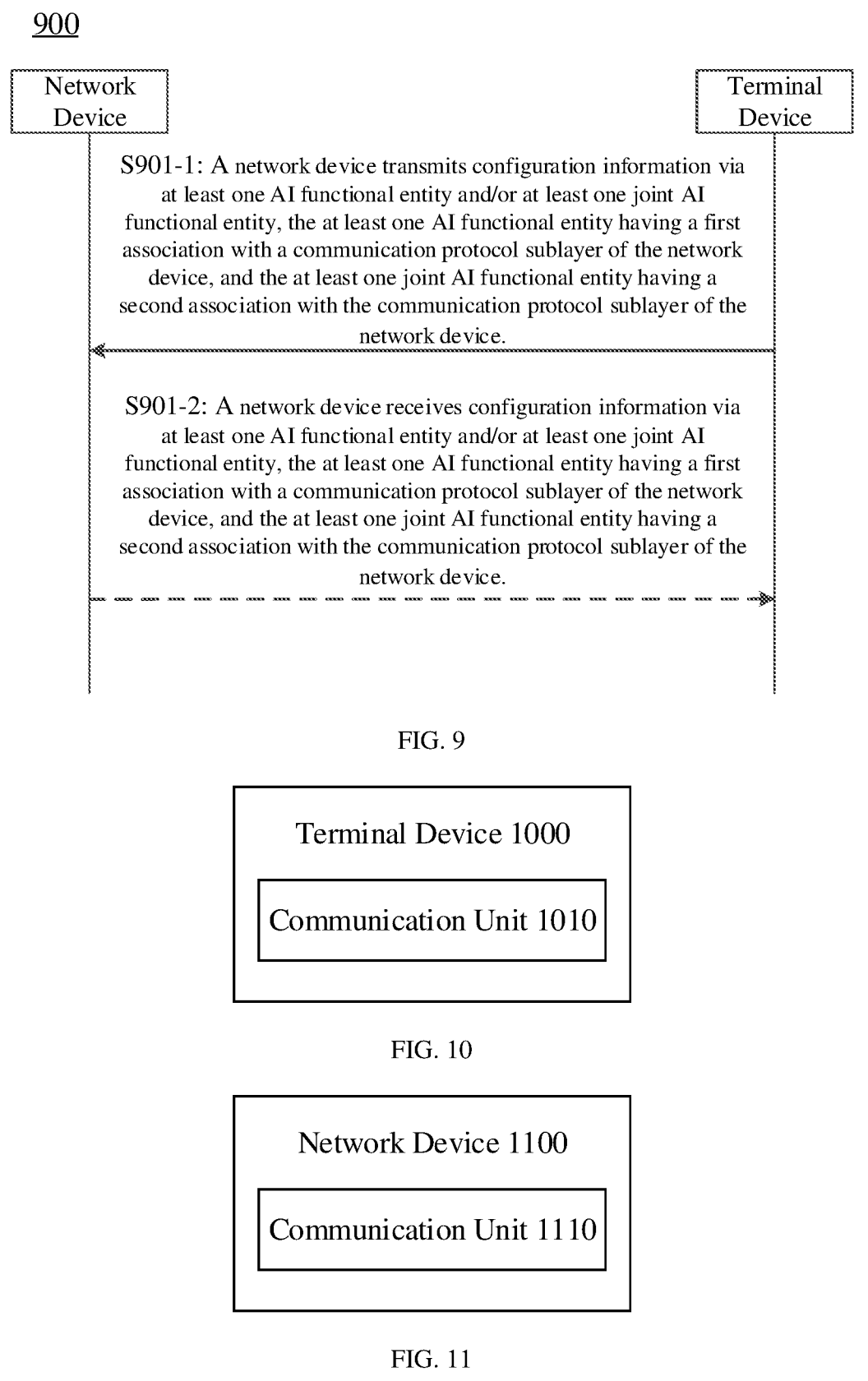

FIG. 9 is a schematic flowchart illustrating a wireless communication method 900 according to an embodiment of the present disclosure. As shown in FIG. 9, the method 900 may include at least part of the following content.

At S910-1, a network device transmits configuration information via at least one AI functional entity and/or at least one joint AI functional entity. The at least one AI functional entity has a first association with a communication protocol sublayer of the network device, and the at least one joint AI functional entity has a second association with the communication protocol sublayer of the network device.

At S910-2, a network device receives configuration information via at least one AI functional entity and/or at least one joint AI functional entity. The at least one AI functional entity has a first association with a communication protocol sublayer of the network device, and the at least one joint AI functional entity has a second association with the communication protocol sublayer of the network device.

It should be noted that, in this embodiment, the action at S910-1 and the action at S910-2 correspond to the scenarios where the network device transmits and receives the configuration, respectively. The action at S910-2 is optional, and thus the action at S910-2 is represented by a dotted line in FIG. 9.

The action at S910-1 will be described as follows.

The configuration information transmitted by the network device via the at least one AI functional entity and/or the at least one joint AI functional entity can be determined by a basic functional entity of the network device based on a predefined algorithm, or can be determined by the network device based on an AI functional entity and/or joint AI functional entity associated with the communication protocol sublayer at the network device.

The action at S910-2 will be described as follows.

The configuration information received by the network device via the at least one AI functional entity and/or the at least one joint AI functional entity can be determined by a basic functional entity of a terminal device based on a predefined algorithm, or can be determined by the terminal device based on the at least one AI functional entity and/or the at least one joint AI functional entity.

Optionally, the terminal device may transmit the configuration information to at least one network device via at least one AI functional entity and/or at least one joint AI functional entity.

The communication protocol sublayer in this embodiment is similar to the communication protocol sublayer in the terminal embodiment shown in FIG. 4, and details thereof will be omitted here.

The embodiments of the present disclosure can be divided into at least the following three possible implementations according to different functional entities of the network device for receiving or transmitting the configuration information: Implementation 1 where the network device receives or transmits the configuration information via at least one AI functional entity; Implementation 2 where the network device receives or transmits the configuration information via at least one joint AI functional entity; and Implementation 3 where the network device receives or transmits the configuration information via at least one AI functional entity and at least one joint AI functional entity.

Implementation 1

Referring to FIG. 5*a*, each communication protocol sublayer in the user plane protocol stack of the network device includes an AI functional entity associated with the communication protocol sublayer. Referring to FIG. 5*b*, each communication protocol sublayer in the control plane protocol stack of the network device includes an AI functional entity associated with the communication protocol sublayer. Referring to FIG. 6*a*, the AI functional entity associated with each communication protocol sublayer in the user plane protocol stack of the network device is independent of the communication protocol sublayer. Referring to FIG. 6*b*, the AI functional entity associated with each communication protocol sublayer in the control plane protocol stack of the network device is independent of the associated communication protocol sublayer.

It should be noted that, FIGS. 5*a* to 6*b* are all described with reference to an example where the first association between the AI functional entity and the communication protocol sublayer of the network device satisfies a one-to-one correspondence. In addition, the first association in this embodiment may further include a one-to-multiple correspondence between AI functional entities and communication protocol sublayers, a multiple-to-one correspondence between AI functional entities and communication protocol sublayers, or a multiple-to-multiple correspondence between AI functional entities and communication protocol sublayers, which are not shown in FIG. 5*a* to FIG. 6*b*. Moreover, not all communication protocol sublayers need to be associated with AI functional entities. FIG. 5*a* to FIG. 6*b* only illustrate the example where all communication protocol sublayers are associated with AI functional entities, and the present disclosure is not limited to this.

In any of the embodiments shown in FIGS. 5*a* to 6*b*, there may be a protocol link between the AI functional entities included in counterpart communication protocol sublayers of the network device and the terminal device. For example, the AI functional entity associated with the MAC layer of the network device and the AI functional entity associated with the MAC layer of the terminal device can communicate with each other via the associated communication protocol sublayers, or the AI functional entity associated with the MAC layer of the network device can communicate with the AI functional entity associated with the MAC layer of the terminal device, and the present disclosure is not limited to this.

It should be noted that the protocol link between the AI functional entities included in counterpart communication protocol sublayers of the network device and the terminal device may be a logical connection, and the communication between the network device and the terminal device can be achieved via an air interface.

Implementation 2

Referring to FIG. 7*a*, a joint AI functional entity associated with each communication protocol sublayer in the user plane protocol stack of the network device is independent of each communication protocol sublayer. Referring to FIG. 7*b*, a joint AI functional entity associated with each communication protocol sublayer in the control plane protocol stack of the network device is independent of each communication protocol sublayer.

It should be noted that both FIG. 7*a* and FIG. 7*b* are described with reference to the example where the at least one joint AI functional entity is independent of the corresponding communication protocol sublayer. In addition, the at least one joint AI functional entity may be the corresponding communication protocol sublayer.

Both FIG. 7*a* and FIG. 7*b* are described with reference to the example where the second association between the joint AI functional entity and the communication protocol sublayer of the network device satisfies a one-to-multiple correspondence. In addition, the second association in this embodiment may include a one-to-one correspondence between joint AI functional entities and communication protocol sublayers, a multiple-to-one correspondence between joint AI functional entities and communication protocol sublayers, or a multiple-to-multiple correspondence between joint AI functional entities and communication protocol sublayers, which are not shown in FIG. 7*a* and FIG. 7*b*.

In FIG. 7*a* or FIG. 7*b*, there may be a protocol link between the joint AI functional entities associated with counterpart communication protocol sublayers of the network device and the terminal device. For example, the joint AI functional entity associated with the MAC layer of the network device and the joint AI functional entity associated with the MAC layer of the terminal device can communicate with each other via the associated communication protocol sublayers, or the joint AI functional entity associated with the MAC layer of the network device can communicate with the joint AI functional entity associated with the MAC layer of the terminal device, and the present disclosure is not limited to this.

It should be noted that the protocol link between the joint AI functional entities associated with counterpart communication protocol sublayers of the network device and the terminal device may be a logical connection, and the communication between the network device and the terminal device can be achieved via an air interface.

Implementation 3

Referring to FIG. 8*a*, the joint AI functional entity and the at least one AI functional entity in the user plane protocol stack of the network device satisfy a one-to-multiple correspondence in the third association, the joint AI functional entity is independent of the at least one AI functional entity, and the at least one AI functional entity is its corresponding communication protocol sublayer.

Referring to FIG. 8*b*, the joint AI functional entity and the at least one AI functional entity in the control plane protocol stack of the network device satisfy a one-to-multiple correspondence in the third association, the joint AI functional entity is independent of the at least one AI functional entity, and the at least one AI functional entity is its corresponding communication protocol sublayer.

Referring to FIG. 8*c*, the joint AI functional entity and the at least one AI functional entity in the user plane protocol stack of the network device satisfy a one-to-multiple correspondence in the third association, the joint AI functional entity is independent of the at least one AI functional entity, and the at least one AI functional entity is independent of its corresponding communication protocol sublayer.

Referring to FIG. 8*d*, the joint AI functional entity and the at least one AI functional entity in the control plane protocol stack of the network device satisfy a one-to-multiple correspondence in the third association, the joint AI functional entity is independent of the at least one AI functional entity, and the at least one AI functional entity is independent of its corresponding communication protocol sublayer.

Referring to FIG. 8*e*, the joint AI functional entity and the at least one AI functional entity in the user plane protocol stack of the network device satisfy a one-to-multiple correspondence in the third association, the joint AI functional entity includes the at least one AI functional entity, and the at least one AI functional entity is independent of its corresponding communication protocol sublayer.

Referring to FIG. 8*f*, the joint AI functional entity and the at least one AI functional entity in the control plane protocol stack of the network device satisfy a one-to-multiple correspondence in the third association, the joint AI functional entity includes the at least one AI functional entity, and the at least one AI functional entity is independent of its corresponding communication protocol sublayer.

It should be noted that, in any of the embodiments shown in FIG. 8*a* to FIG. 8*f*, the present disclosure is not limited to any specific first association between the at least one AI functional entity and the communication protocol sublayer in the network device, and this embodiment is described with reference to the example where the first association is a one-to-one correspondence between the at least one AI functional entity and the communication protocol sublayer.

In this embodiment, FIG. 8*a* to FIG. 8*f* are all described with reference to the example where the at least one joint AI functional entity and the at least one AI functional entity satisfy the one-to-multiple correspondence in the third association. In addition, the third association in this embodiment may further include a multiple-to-multiple correspondence between AI functional entities and joint AI functional entities, which is not shown in FIG. 8*a* and FIG. 8*f*.

It should be noted that multiple AI functional entities may be associated with one joint AI functional entity, such that the AI functional entities can be combined or cooperate with each other. In other words, the main function of the joint AI functional entity is to coordinate data interaction between the AI functional entities associated with the respective communication protocol sublayers, thereby achieving joint optimization of configuration of multiple communication protocol sublayers.

In any of the embodiments shown in FIGS. 8*a* to 8*f*, there may be a protocol link between counterpart joint AI functional entities of the network device and the terminal device, and the joint AI functional entity of the network device can communicate with the joint AI functional entity of the terminal device, or the joint AI functional entity of the network device can communicate with the at least one AI functional entity of the terminal device, or the joint AI functional entity of the network device can communicate with the communication protocol sublayer of the terminal device, and the present disclosure is not limited to this.

In some embodiments, the network device may receive instruction information to activate or deactivate or reconfigure the at least one AI functional entity and/or at least one joint AI functional entity of the network device.

In some embodiments, the instruction information may be transmitted by at least one of: a terminal device, a core network device, an OAM device, or an AI control device.

In some embodiments, the instruction information to activate or deactivate or reconfigure the at least one AI functional entity and/or at least one joint AI functional entity may be carried by a dedicated message or a common message. Here, the dedicated message or common message may be an existing message with an AI function extension, or may be a new dedicated message or common message defined specifically for the at least one AI functional entity and/or at least one joint AI functional entity.

Here, the dedicated message can further be at least one of an AI message, an RRC message, a Layer 2 uplink instruction, or an Uplink Control Information (UCI) instruction, and the common message may be at least one of a system broadcast/multicast/multicast message or an interface common message, and the present disclosure is not limited to this.

In some embodiments, the instruction information to activate or reconfigure the at least one AI functional entity and/or at least one joint AI functional entity may further include control configuration information for the AI functional entity and/or the joint AI functional entity.

In some embodiments, the control configuration information may include, but not limited to, at least one of the following information:

an algorithm configuration for the AI functional entity and/or the joint AI functional entity, an application scenario configuration for the AI functional entity and/or the joint AI functional entity, or an optimization target configuration for an application scenario for the AI functional entity and/or the joint AI functional entity.

Here, the optimization target configuration for the configuration scenario may include information such as a type and number of required input parameters, a type and number of required output parameters, and a data processing rule.

Exemplarily, the instruction information may be transmitted by at least one AI functional entity and/or at least one joint AI functional entity of the terminal device, or may be transmitted by each communication protocol sublayer via signaling. Correspondingly, the configuration information may be received by at least one AI functional entity and/or at least one joint AI functional entity of the network device, or by each communication protocol sublayer of the network device via signaling, and the present disclosure is not limited to this.

Therefore, in the embodiment of the present disclosure, the terminal device can receive or transmit configuration information via at least one AI functional entity and/or at least one joint AI functional entity associated with a communication protocol sublayer. The at least one AI functional entity and/or at least one joint AI functional entity is defined in the communication protocol stack, so as to obtain appropriate configuration information in different scenarios, optimize the configuration of the communication protocol stack, and achieve the intelligent optimization of the communication protocol stack, such that the communication protocol stack can obtain the best communication performance in different application scenarios.

In some embodiments, when a type of configuration information received or generated by the at least one AI functional entity and/or the at least one joint AI functional entity is same as a type of a configuration received or generated or stored by the corresponding communication protocol sublayer, the network device may use the configuration received or generated by the at least one AI functional entity and/or the at least one joint AI functional entity based on a protocol or implementation or the configuration received or generated or stored by the corresponding communication protocol sublayer based on a protocol or implementation; and/or when the type of the configuration information received or generated by the at least one AI functional entity and/or the at least one joint AI functional entity is different from the type of the configuration received or generated or stored by the corresponding communication protocol sublayer, the network device may use the configuration information received or generated or stored by the communication protocol sublayer.

Therefore, in the embodiment of the present disclosure, the network device can receive or transmit configuration information via at least one AI functional entity and/or at least one joint AI functional entity associated with a communication protocol sublayer. The at least one AI functional entity and/or at least one joint AI functional entity is defined in the communication protocol stack, so as to obtain appropriate configuration information in different scenarios, optimize the configuration of the communication protocol stack, and achieve the intelligent optimization of the communication protocol stack, such that the communication protocol stack can obtain the best communication performance in different application scenarios.

In some embodiments, in either the embodiment for the terminal device or the embodiment for the network device, each of the at least one AI functional entity mentioned in any embodiment at least includes: a data input module and data output module.

Further, each of the at least one AI functional entity may further include at least one of: a data training module, a data model inference module, a data storage module, or an AI functional entity control module.

Here, the data training module is mainly responsible for extracting feature information from collected data, such as extracting and gathering measurement-related feature information. The data model inference module is mainly responsible for estimating or predicting next possible behaviors of the terminal device or network device after extraction of feature information, to generate new configuration information for use by the at least one AI functional entity and/or the at least one joint AI functional entity and/or each communication protocol sublayer. The data storage module is responsible for storing unprocessed and/or processed data, the processed data including original data or derived or configured data generated according to the original data, and the present disclosure is not limited to this.

The AI functional entity control module or the joint AI functional entity control module is mainly responsible for control instructions related to the AI functional entity or the joint AI functional entity, including control between respective modules within the AI functional entity or the joint AI functional entity; and/or management of control processes between counterpart AI functional entities or joint AI functional entities of the terminal device and the network device, and the present disclosure is not limited to this.

The present disclosure is not limited to modeling of input or output between any two of the data input module, the data output module, the data training module, the data model inference module, the data storage module, the joint AI functional entity control module, and the AI functional entity control module.

In some embodiments, the AI functional entity and/or joint AI functional entity of the terminal device generates new configuration information by collecting data of each communication protocol sublayer during the operation of the terminal device, then each communication protocol sublayer of the terminal device, when satisfying specified conditions, may use the new configuration generated by the AI functional entity and/or the joint AI functional entity to continue the communication.

Exemplarily, if the configuration information generated by these AI functional entities and/or joint AI functional entities does not involve configuration synchronization with the network device, each communication protocol sublayer of the terminal device can directly apply the configuration information; but if the configuration information generated by these AI functional entities and/or joint AI functional entities involves configuration synchronization with the network device, the terminal device should negotiate and confirm with the network device before using the new configuration information. The negotiation process may be done by interaction between counterpart AI functional entities and/or joint AI functional entities of the terminal device and the network device, or via control instructions of each communication protocol sublayer between the terminal device and the network device.

Similarly, the AI functional entity and/or joint AI functional entity of the network device generates new configuration information by collecting data of each communication protocol sublayer during the operation of at least one terminal device, then each communication protocol sublayer of the network device, when satisfying specified conditions, may use the configuration information generated by the AI functional entity and/or the joint AI functional entity and/or configure the configuration information generated by the AI functional entity and/or the joint AI functional entity for use by the at least one terminal device.

Exemplarily, if the configuration information generated by these AI functional entities and/or joint AI functional entities does not involve configuration synchronization with the terminal device, each communication protocol sublayer of the network device can directly apply the configuration information; but if the configuration information generated by these AI functional entities and/or the joint AI functional entity involves configuration synchronization with the terminal device, the network device should negotiate and confirm with the terminal device before using the new configuration information. The negotiation process may be done by interaction between counterpart AI functional entities and/or joint AI functional entities of the network device and the terminal device, or via control instructions of each communication protocol sublayer between the terminal device and the network device.

It should be noted that, for either the terminal device or the network device, there are two meanings for the AI functional entity and/or the joint AI functional entity to collect the data of each communication protocol sublayer: the data collected by the AI functional entity and/or the joint AI functional entity from each communication protocol sublayer may be original data, such as a size of an original data packet, or data derived from the original data, such as the system throughput within a period of time, and the present disclosure is not limited to this.

The configuration data generated by the AI functional entity and/or the joint AI functional entity of the terminal device or network device may be configuration information that needs to be applied by each communication protocol sublayer or configuration information independent of the configuration that needs to be applied by each communication protocol sublayer, and the present disclosure is not limited to this.

The method embodiments of the present disclosure have been described in detail above with reference to FIGS. 4-9, and the apparatus embodiments of the present disclosure will be described in detail below with reference to FIGS. 10-14. It can be appreciated that the apparatus embodiments and the method embodiments correspond to each other, and for similar descriptions, reference can be made to the method embodiments.

FIG. 10 shows a schematic block diagram of a terminal device 1000 according to an embodiment of the present disclosure. As shown in FIG. 10, the terminal device 1000 includes:

a communication unit 1010 is configured to receive or transmit configuration information via at least one Artificial Intelligence (AI) functional entity and/or at least one joint AI functional entity. The at least one AI functional entity has a first association with a communication protocol sublayer of the terminal device, and the at least one joint AI functional entity has a second association with the communication protocol sublayer of the terminal device.

In some embodiments, the at least one AI functional entity may be a part of its corresponding communication protocol sublayer, or the at least one AI functional entity may be independent of its corresponding communication protocol sublayer.

In some embodiments, in the first association, a one-to-one correspondence may hold between AI functional entities and communication protocol sublayers, a one-to-multiple correspondence may hold between AI functional entities and communication protocol sublayers, a multiple-to-one correspondence may hold between AI functional entities and communication protocol sublayers, or a multiple-to-multiple correspondence may hold between AI functional entities and communication protocol sublayers.

In some embodiments, the at least one joint AI functional entity may be a part of its corresponding communication protocol sublayer, or the at least one joint AI functional entity may be independent of its corresponding communication protocol sublayer.

In some embodiments, in the second association, a one-to-one correspondence may hold between joint AI functional entities and communication protocol sublayers, a one-to-multiple correspondence may hold between joint AI functional entities and communication protocol sublayers, a multiple-to-one correspondence may hold between joint AI functional entities and communication protocol sublayers, or a multiple-to-multiple correspondence may hold between joint AI functional entities and communication protocol sublayers.

In some embodiments, the at least one AI functional entity may have a third association with the at least one joint AI functional entity.

In some embodiments, in the third association, a multiple-to-one correspondence may hold between AI functional entities and joint AI functional entities, or a multiple-to-multiple correspondence may hold between AI functional entities and joint AI functional entities.

In some embodiments, the at least one joint AI functional entity may include the at least one AI functional entity, or the at least one joint AI functional entity may be independent of the at least one AI functional entity.

In some embodiments, the communication unit 1010 may be further configured to:

receive instruction information to activate or deactivate or reconfigure the at least one AI functional entity and/or the at least one joint AI functional entity.

In some embodiments, the instruction information may further include control configuration information for the at least one AI functional entity and/or the at least one joint AI functional entity.

The control configuration information may include at least one of:

an algorithm configuration for the AI functional entity and/or the joint AI functional entity, an application scenario configuration for the AI functional entity and/or the joint AI functional entity, or an optimization target configuration for an application scenario for the AI functional entity and/or the joint AI functional entity.

In some embodiments, the instruction information may be by at least one of the following entities:

a network device, an Operation Administration and Maintenance (OAM) device, or an AI control device.

Here, the network device may include a core network device and/or an access network device.

In some embodiments, the instruction information may be carried by one of:

a dedicated message or a common message.

In some embodiments, the communication unit 1010 may be further configured to:

use, when a type of configuration information received or generated by the at least one AI functional entity and/or the at least one joint AI functional entity is same as a type of a configuration received or generated or stored by the corresponding communication protocol sublayer, the configuration received or generated by the at least one AI functional entity and/or the at least one joint AI functional entity based on a protocol or implementation or the configuration received or generated or stored by the corresponding communication protocol sublayer based on a protocol or implementation; and/or use, when the type of the configuration information received or generated by the at least one AI functional entity and/or the at least one joint AI functional entity is different from the type of the configuration received or generated or stored by the corresponding communication protocol sublayer, the configuration information received or generated or stored by the communication protocol sublayer.

In some embodiments, each of the at least one AI functional entity may include at least:

a data input module and a data output module.

In some embodiments, each of the at least one AI functional entity may further include at least one of:

a data training module, a data model inference module, a data storage module, or an AI functional entity control module.

In some embodiments, each of the at least one joint AI functional entity may include at least:

a data input module and a data output module.

In some embodiments, each of the at least one joint AI functional entity may further include at least one of:

a data training module, a data model inference module, a data storage module, or an AI functional entity control module.

In some embodiments, the communication protocol sublayer may include at least one of:

a Non-Access Stratum (NAS) layer, a Service Data Adaptation Protocol (SDAP) layer, a Radio Resource Control (RRC) layer, a Packet Data Convergence Protocol (PDCP) layer, a Radio Link Control (RLC) layer, a Media Access Control (MAC) layer, a Physical (PHY) layer, or a Backhaul Adaptation Protocol (BAP) layer.

It can be appreciated that the terminal device 1000 according to the embodiment of the present disclosure may correspond to the terminal device in the method embodiment of the present disclosure, and the above and other operations and/or functions of the respective units in the terminal device 1000 are provided for the purpose of implementing the process flow corresponding to the terminal device in any of the methods shown in FIGS. 4-9, and details thereof will be not omitted here for brevity.

FIG. 11 shows a schematic block diagram of a network device 1100 according to an embodiment of the present disclosure. As shown in FIG. 11, the network device 1100 includes:

a communication unit 1110 configured to receive or transmit configuration information via at least one Artificial Intelligence (AI) functional entity and/or at least one joint AI functional entity.

The at least one AI functional entity has a first association with a communication protocol sublayer of the network device, and the at least one joint AI functional entity has a second association with the communication protocol sublayer of the network device.

In some embodiments, the at least one AI functional entity may be a part of its corresponding communication protocol sublayer, or the at least one AI functional entity may be independent of its corresponding communication protocol sublayer.

In some embodiments, in the first association, a one-to-one correspondence may hold between AI functional entities and communication protocol sublayers, a one-to-multiple correspondence may hold between AI functional entities and communication protocol sublayers, a multiple-to-one correspondence may hold between AI functional entities and communication protocol sublayers, or a multiple-to-multiple correspondence may hold between AI functional entities and communication protocol sublayers.

In some embodiments, the at least one joint AI functional entity may be a part of its corresponding communication protocol sublayer, or the at least one joint AI functional entity may be independent of its corresponding communication protocol sublayer.

In some embodiments, in the second association, a one-to-one correspondence may hold between joint AI functional entities and communication protocol sublayers, a one-to-multiple correspondence may hold between joint AI functional entities and communication protocol sublayers, a multiple-to-one correspondence may hold between joint AI functional entities and communication protocol sublayers, or a multiple-to-multiple correspondence may hold between joint AI functional entities and communication protocol sublayers.

In some embodiments, the at least one AI functional entity may have a third association with the at least one joint AI functional entity.

In some embodiments, in the third association, a multiple-to-one correspondence may hold between AI functional entities and joint AI functional entities, or a multiple-to-multiple correspondence may hold between AI functional entities and joint AI functional entities.

In some embodiments, the at least one joint AI functional entity may include the at least one AI functional entity, or the at least one joint AI functional entity may be independent of the at least one AI functional entity.

In some embodiments, the communication unit 1110 may be configured to:

receive instruction information to activate or deactivate or reconfigure the at least one AI functional entity and/or the at least one joint AI functional entity.

In some embodiments, the instruction information may further include control configuration information for the at least one AI functional entity and/or the at least one joint AI functional entity.

The control configuration information may include at least one of:

an algorithm configuration for the AI functional entity and/or the joint AI functional entity, an application scenario configuration for the AI functional entity and/or the joint AI functional entity, or an optimization target configuration for an application scenario for the AI functional entity and/or the joint AI functional entity.

In some embodiments, the instruction information may be transmitted by at least one of:

a terminal device, a core network device, an Operation Administration and Maintenance (OAM) device, or an AI control device.

In some embodiments, the instruction information may be carried by one of:

a dedicated message or a common message.

In some embodiments, the communication unit 1110 may be further configured to:

use, when a type of configuration information received or generated by the at least one AI functional entity and/or the at least one joint AI functional entity is same as a type of a configuration received or generated or stored by the corresponding communication protocol sublayer, the configuration received or generated by the at least one AI functional entity and/or the at least one joint AI functional entity based on a protocol or implementation or the configuration received or generated or stored by the corresponding communication protocol sublayer based on a protocol or implementation; and/or use, when the type of the configuration information received or generated by the at least one AI functional entity and/or the at least one joint AI functional entity is different from the type of the configuration received or generated or stored by the corresponding communication protocol sublayer, the configuration information received or generated or stored by the communication protocol sublayer.

In some embodiments, each of the at least one AI functional entity may include at least:

a data input module and a data output module.

In some embodiments, each of the at least one AI functional entity may further include at least one of:

a data training module, a data model inference module, a data storage module, or an AI functional entity control module.

In some embodiments, each of the at least one joint AI functional entity may include at least:

a data input module and a data output module.

In some embodiments, each of the at least one joint AI functional entity may further include at least one of:

a data training module, a data model inference module, a data storage module, or an AI functional entity control module.

In some embodiments, the communication protocol sublayer may include at least one of:

a Non-Access Stratum (NAS) layer, a Service Data Adaptation Protocol (SDAP) layer, a Radio Resource Control (RRC) layer, a Packet Data Convergence Protocol (PDCP) layer, a Radio Link Control (RLC) layer, a Media Access Control (MAC) layer, a Physical (PHY) layer, or a Backhaul Adaptation Protocol (BAP) layer.

It can be appreciated that the network device 1100 according to the embodiment of the present disclosure may correspond to the network device in the method embodiment of the present disclosure, and the above and other operations and/or functions of the respective units in the network device 1100 are provided for the purpose of implementing the process flow corresponding to the network device in any of the methods shown in FIGS. 4-9, and details thereof will be not omitted here for brevity.

Figure 12:
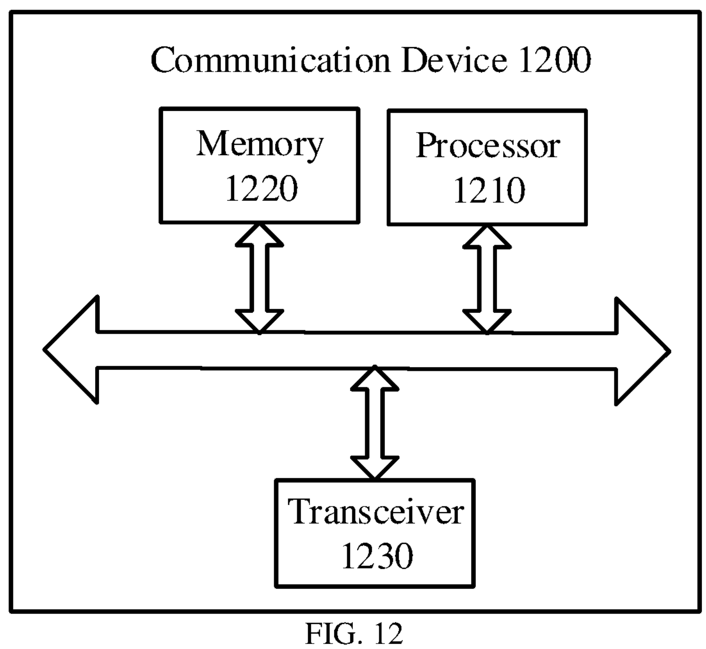
FIG. 12 is a schematic structural diagram of a communication device according to an embodiment of the present disclosure.

FIG. 12 is a schematic diagram showing a structure of a communication device 1200 according to an embodiment of the present disclosure. The communication device 1200 shown in FIG. 12 includes a processor 1210, and the processor 1210 can invoke and execute a computer program from a memory to implement the method in the embodiment of the present disclosure.

In some embodiments, as shown in FIG. 12, the communication device 1200 may further include a memory 1220. The processor 1210 can invoke and execute a computer program from the memory 1220 to implement the method in the embodiment of the present disclosure.

The memory 1220 may be a separate device independent from the processor 1210, or may be integrated in the processor 1210.

In some embodiments, as shown in FIG. 12, the communication device 1200 may further include a transceiver 1230, and the processor 1210 may control the transceiver 1230 to communicate with other devices, and in particular, transmit information or data to other devices, or receive information or data transmitted by other devices.

Here, the transceiver 1230 may include a transmitter and a receiver. The transceiver 1230 may further include one or more antennas.

In some embodiments, the communication device 1200 may specifically be the network device according to the embodiment of the present disclosure, and the communication device 1200 may implement the corresponding processes implemented by the network device in any of the methods according to the embodiments of the present disclosure. For the sake of brevity, details thereof will be omitted here.

In some embodiments, the communication device 1200 may specifically be the terminal device according to the embodiment of the present disclosure, and the communication device 1200 may implement the corresponding processes implemented by the terminal device in any of the methods according to the embodiments of the present disclosure. For the sake of brevity, details thereof will be omitted here.

Figure 13:
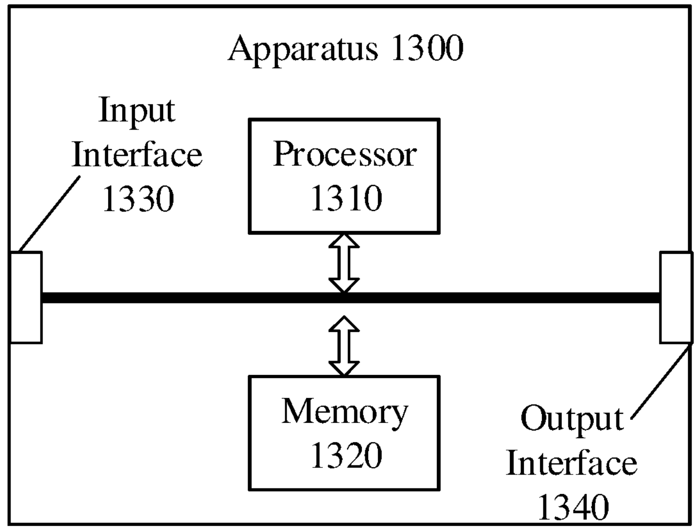
FIG. 13 is a schematic structural diagram of an apparatus according to an embodiment of the present disclosure.

FIG. 13 is a schematic diagram showing a structure of an apparatus according to an embodiment of the present disclosure. The apparatus 1300 shown in FIG. 13 includes a processor 1310, and the processor 1310 can invoke and execute a computer program from a memory to implement the method in the embodiment of the present disclosure.

In some embodiments, as shown in FIG. 13, the apparatus 1300 may further include a memory 1320. The processor 1310 can invoke and execute a computer program from the memory 1320 to implement the method in the embodiment of the present disclosure.

The memory 1320 may be a separate device independent from the processor 1310, or may be integrated in the processor 1310.

In some embodiments, the apparatus 1300 may further include an input interface 1330. The processor 1310 can control the input interface 1330 to communicate with other devices or chips, and in particular, obtain information or data transmitted by other devices or chips.

In some embodiments, the apparatus 1300 may further include an output interface 1340. The processor 1310 can control the output interface 1340 to communicate with other devices or chips, and in particular, output information or data to other devices or chips.

In some embodiments, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

In some embodiments, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

In some embodiments, the apparatus in the embodiment of the present disclosure may be a chip, e.g., system-level chip, a system-chip, a chip system, or a system-on-chip.

Figure 14:
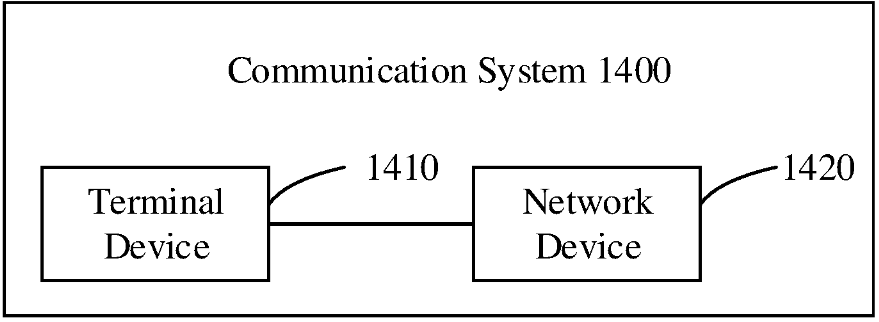
FIG. 14 is a schematic block diagram of a communication system according to an embodiment of the present disclosure.

FIG. 14 is a schematic block diagram showing a communication system 1400 according to an embodiment of the present disclosure. As shown in FIG. 14, the communication system 1400 includes a terminal device 1410 and a first device 1420.

Here, the terminal device 1410 can be configured to implement the corresponding functions implemented by the terminal device in the above method, and the network device 1420 can be configured to implement the corresponding functions implemented by the first device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

In some embodiments, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In some embodiments, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

In some embodiments, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In some embodiments, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

In some embodiments, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In some embodiments, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product.

The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of the present disclosure as defined by the claims as attached.

What is claimed is:

1. A wireless communication method, comprising:

receiving or transmitting, by a terminal device, configuration information via at least one Artificial Intelligence (AI) functional entity and/or at least one joint AI functional entity, wherein the at least one AI functional entity has a first association with a communication protocol sublayer of the terminal device, and the at least one joint AI functional entity has a second association with the communication protocol sublayer of the terminal device;

wherein the method further comprises:

using, by the terminal device when a type of configuration information generated by the at least one AI functional entity and/or the at least one joint AI functional entity is same as a type of a configuration received or generated or stored by the corresponding communication protocol sublayer, the configuration generated by the at least one AI functional entity and/or the at least one joint AI functional entity based on a protocol or implementation.

2. The method according to claim 1, wherein the at least one AI functional entity is a part of its corresponding communication protocol sublayer, or the at least one AI functional entity is independent of its corresponding communication protocol sublayer.

3. The method according to claim 1, wherein, in the first association, a one-to-one correspondence holds between AI functional entities and communication protocol sublayers, a one-to-multiple correspondence holds between AI functional entities and communication protocol sublayers, a multiple-to-one correspondence holds between AI functional entities and communication protocol sublayers, or a multiple-to-multiple correspondence holds between AI functional entities and communication protocol sublayers.

4. The method according to claim 1, wherein the at least one joint AI functional entity is a part of its corresponding communication protocol sublayer, or the at least one joint AI functional entity is independent of its corresponding communication protocol sublayer.

5. The method according to claim 1, wherein, in the second association, a one-to-one correspondence holds between joint AI functional entities and communication protocol sublayers, a one-to-multiple correspondence holds between joint AI functional entities and communication protocol sublayers, a multiple-to-one correspondence holds between joint AI functional entities and communication protocol sublayers, or a multiple-to-multiple correspondence holds between joint AI functional entities and communication protocol sublayers.

6. The method according to claim 1, wherein the at least one AI functional entity has a third association with the at least one joint AI functional entity.

7. The method according to claim 6, wherein, in the third association, a multiple-to-one correspondence holds between AI functional entities and joint AI functional entities, or a multiple-to-multiple correspondence holds between AI functional entities and joint AI functional entities.

8. The method according to claim 1, wherein the at least one joint AI functional entity comprises the at least one AI functional entity, or the at least one joint AI functional entity is independent of the at least one AI functional entity.

9. The method according to claim 1, further comprising:

receiving, by the terminal device, instruction information to activate or deactivate or reconfigure the at least one AI functional entity and/or the at least one joint AI functional entity.

10. The method according to claim 9, wherein the instruction information further comprises control configuration information for the at least one AI functional entity and/or the at least one joint AI functional entity, wherein the control configuration information comprises at least one of:

an algorithm configuration for the AI functional entity and/or the joint AI functional entity, an application scenario configuration for the AI functional entity and/or the joint AI functional entity, or an optimization target configuration for an application scenario for the AI functional entity and/or the joint AI functional entity.

11. The method according to claim 1, further comprising:

using, by the terminal device when a type of configuration information received by the at least one AI functional entity and/or the at least one joint AI functional entity is same as a type of a configuration received or generated or stored by the corresponding communication protocol sublayer, the configuration received by the at least one AI functional entity and/or the at least one joint AI functional entity based on a protocol or implementation or the configuration received or generated or stored by the corresponding communication protocol sublayer based on a protocol or implementation; and/or using, by the terminal device when the type of the configuration information received or generated by the at least one AI functional entity and/or the at least one joint AI functional entity is different from the type of the configuration received or generated or stored by the corresponding communication protocol sublayer, the configuration information received or generated or stored by the communication protocol sublayer.

12. The method according to claim 1, wherein the communication protocol sublayer comprises at least one of:

a Non-Access Stratum (NAS) layer, a Service Data Adaptation Protocol (SDAP) layer, a Radio Resource Control (RRC) layer, a Packet Data Convergence Protocol (PDCP) layer, a Radio Link Control (RLC) layer, a Media Access Control (MAC) layer, a Physical (PHY) layer, or a Backhaul Adaptation Protocol (BAP) layer.

13. A terminal device, comprising a processor and a memory, wherein the memory has a computer program stored thereon, and the processor is configured to invoke and execute the computer program stored in the memory to cause the terminal device to perform:

receiving or transmiting configuration information via at least one Artificial Intelligence (AI) functional entity and/or at least one joint AI functional entity, wherein the at least one AI functional entity has a first association with a communication protocol sublayer of the terminal device, and the at least one joint AI functional entity has a second association with the communication protocol sublayer of the terminal device;

wherein the terminal device further performs:

using, when a type of configuration information generated by the at least one AI functional entity and/or the at least one joint AI functional entity is same as a type of a configuration received or generated or stored by the corresponding communication protocol sublayer, the configuration generated by the at least one AI functional entity and/or the at least one joint AI functional entity based on a protocol or implementation.

14. The terminal device according to claim 13, wherein the at least one AI functional entity is a part of its corresponding communication protocol sublayer, or the at least one AI functional entity is independent of its corresponding communication protocol sublayer.

15. The terminal device according to claim 13, wherein the at least one joint AI functional entity is a part of its corresponding communication protocol sublayer, or the at least one joint AI functional entity is independent of its corresponding communication protocol sublayer.

16. The terminal device according to claim 13, wherein the at least one joint AI functional entity comprises the at least one AI functional entity, or the at least one joint AI functional entity is independent of the at least one AI functional entity.

17. A network device, comprising a processor and a memory, wherein the memory has a computer program stored thereon, and the processor is configured to invoke and execute the computer program stored in the memory to cause the network device to perform;

receiving or transmitting configuration information via at least one Artificial Intelligence (AI) functional entity and/or at least one joint AI functional entity, wherein the at least one AI functional entity has a first association with a communication protocol sublayer of the network device, and the at least one joint AI functional entity has a second association with the communication protocol sublayer of the network device;

wherein the network device further performs:

using, when a type of configuration information generated by the at least one AI functional entity and/or the at least one joint AI functional entity is same as a type of a configuration received or generated or stored by the corresponding communication protocol sublayer, the configuration generated by the at least one AI functional entity and/or the at least one joint AI functional entity based on a protocol or implementation.

18. The network device according to claim 17, wherein the at least one AI functional entity is a part of its corresponding communication protocol sublayer, or the at least one AI functional entity is independent of its corresponding communication protocol sublayer.

19. The network device according to claim 17, wherein the network device further performs:

receiving instruction information to activate or deactivate or reconfigure the at least one AI functional entity and/or the at least one joint AI functional entity.

20. The network device according to claim 17, wherein the network device further performs:

using, when a type of configuration information received by the at least one AI functional entity and/or the at least one joint AI functional entity is same as a type of a configuration received or generated or stored by the corresponding communication protocol sublayer, the configuration received by the at least one AI functional entity and/or the at least one joint AI functional entity based on a protocol or implementation or the configuration received or generated or stored by the corresponding communication protocol sublayer based on a protocol or implementation; and/or using, when the type of the configuration information received or generated by the at least one AI functional entity and/or the at least one joint AI functional entity is different from the type of the configuration received or generated or stored by the corresponding communication protocol sublayer, the configuration information received or generated or stored by the communication protocol sublayer.

* * * * *